United States Patent [19]
Ishizaka et al.

[11] Patent Number: 5,572,679
[45] Date of Patent: Nov. 5, 1996

[54] MULTIPROCESSOR SYSTEM TRANSFERRING ABNORMALITY DETECTION SIGNAL GENERATED IN NETWORKING APPARATUS BACK TO PROCESSOR IN PARALLEL WITH DATA TRANSFER ROUTE

[75] Inventors: Kenichi Ishizaka; Masayuki Katori, both of Kawasaki, Japan

[73] Assignee: Fujitsu Limited, Kawasaki, Japan

[21] Appl. No.: 105,174

[22] Filed: Aug. 12, 1993

[30] Foreign Application Priority Data

Nov. 30, 1992 [JP] Japan .................... 4-320030

[51] Int. Cl.$^6$ ................................. H01J 13/00
[52] U.S. Cl. .................. 395/200.12; 395/200.15; 395/185.09; 395/183.19; 371/71
[58] Field of Search ................ 371/8.2, 57.1, 371/68, 171, 67.1; 379/9, 26, 28, 32; 395/200, 325, 575, 200.01, 200.02, 200.11, 200.12, 200.15, 185.01, 185.09, 183.19; 370/54, 85.1, 85.7, 58.3, 58.1, 85.2; 340/825.8, 827, 825.5, 826

[56] References Cited

U.S. PATENT DOCUMENTS 5,345,229  9/1994  Olnowich et al. .............. 340/825.8

*Primary Examiner*—Alyssa H. Bowler
*Assistant Examiner*—Charles R. Kyle
*Attorney, Agent, or Firm*—Staas & Halsey

[57] ABSTRACT

A multiprocessor system comprising a networking apparatus and a plurality of data processing apparatuses for transferring data through the networking apparatus from one to another of the plurality of data processing apparatuses. The networking apparatus contains: a switch unit for switching data transfer paths between data processing apparatuses; a priority control unit for determining and controlling the data transfer paths in response to requests from the data processing apparatuses; and an abnormality detecting unit for monitoring the operation of the priority control unit, generating and outputting to the data processing apparatus which has output the requests an abnormality informing signal. When the networking apparatus is comprised of a plurality of stages each containing at least one switch circuit for switching data transfer paths, an abnormality detection circuit and an abnormality detection signal transferring unit are provided for each switch circuit, for transferring the abnormality detection signal along the route for the data transfer passing through the switch circuit, in a direction opposite to the direction of the data transfer. Further, identification of the stage at which the abnormality detection signal has been generated, may be maintained until the abnormality detection signal reaches the data processing apparatus.

11 Claims, 10 Drawing Sheets

MULTIPROCESSOR SYSTEM TRANSFERRING ABNORMALITY DETECTION SIGNAL GENERATED IN NETWORKING APPARATUS BACK TO PROCESSOR IN PARALLEL WITH DATA TRANSFER ROUTE

BACKGROUND OF THE INVENTION (1) Field of the Invention

The present invention relates to a multiprocessor system containing a plurality of data processing apparatuses and a networking apparatus which establishes physical links between the plurality of data processing apparatuses.

(2) Description of the Related Art

In some types of parallel processing systems containing a plurality of data processing apparatuses, a networking apparatus is provided for transferring data between the plurality of data processing apparatuses. The networking apparatus receives a connection request from one of the plurality of data processing apparatuses, and establishes a physical link between the data processing apparatus which sends the connection request to the networking apparatus, and another of the plurality of data processing apparatuses, which is requested by the connection request. Such a networking apparatus comprises a plurality of switch units. When trouble occurs in the networking apparatus, it is required that each data processing apparatus recognize the location of the trouble (in which switch unit the trouble has occurred), or recognize the data route which passes through the location of the trouble.

In conventional multiprocessor systems, a counter for detecting hang-up is provided in a data processing apparatus on a sender side for detecting hang-up of a data transfer between data processing apparatuses due to a fault in the networking apparatus. The counter counts the time elapsed from the start of the data transfer, and it determines that the networking apparatus is hung-up when the data transfer is not completed when the counter reaches a predetermined time.

However, the above method for detecting hang-up has the following drawbacks:

The data processing apparatus cannot recognize the location of the trouble (the cause of the hang-up). For example, a defective switch unit cannot be recognized by the data processing apparatus.

In addition, it takes a long time to detect the hang-up. For example, different values must be set for the above predetermined time, depending on the number of data processing apparatuses, the structure of the networking apparatus, and the like.

Further, since the location of the trouble cannot be recognized, a route for the next data transfer cannot be determined.

SUMMARY OF THE INVENTION

An object of the present invention is to provide a multiprocessor system wherein a defective route or switch unit can be recognized immediately by a data processing apparatus which uses the networking apparatus.

Another object of the present invention is to provide a networking apparatus used in a multiprocessor system wherein a route or a switch unit, which contains a trouble, can be recognized immediately by a data processing apparatus which uses the networking apparatus.

According to the first aspect of the present invention, there is provided a multiprocessor system containing a plurality of data processing apparatuses and a networking apparatus for transferring data from one to another of the plurality of data processing apparatuses. The networking apparatus contains: a priority control unit, a switch unit, and an abnormality detecting unit. The priority control unit receives at least one piece of connection request information which is output from at least one of the plurality of data processing apparatuses; determines, based on a predetermined priority order, at least one route which is requested by the at least one piece of connection request information and which can be concurrently established in the switch unit; outputs at least one connection allowance signal to at least one of the plurality of data processing apparatuses which outputs the piece of connection request information requesting the determined route; and controls the switch unit so that the at least one route is established in the switch unit. The switch unit establishes the at least one route determined by the priority control unit under the control of the priority control unit. The abnormality detecting unit monitors the operation of the priority control unit; generates an abnormality informing signal when an abnormality is detected in the operation of the priority control unit; and outputs the abnormality informing signal to the data processing apparatus which has output the piece of connection request information. Each of the plurality of data processing apparatuses contains a connection request information output unit for generating the piece of connection request information and outputting the piece of connection request information to the priority control unit in the networking apparatus.

According to the second aspect of the present invention, in addition to the above construction of the first aspect of the present invention, the switch unit comprises a plurality of stages and a plurality of switch circuits where each stage contains at least one of the plurality of switch circuits. Each switch circuit has at least one input port and at least one output port, and provides a first partial route which constitutes a portion of the route for the data transfer, in the stage to which the switch circuit belongs. Each piece of switch control information contained in each piece of connection request information, contains a plurality of pieces of partial switch control information to be used for controlling the switch units in respective stages which are on the route for the data transfer requested by the piece of connection request information. The priority control unit contains a plurality of priority control circuits, provided for the respective plurality of switch circuits, each for controlling the corresponding one of the plurality of switch circuits so that the corresponding switch circuit in each stage establishes the first partial route according to a corresponding one of the plurality of pieces of partial switch control information. The abnormality detecting unit contains a plurality of abnormality detecting and informing units, provided for each of the plurality of switch circuits. Each abnormality detecting and informing unit contains: an abnormality detection circuit for detecting an abnormality in the priority control circuit corresponding to each abnormality detecting and informing unit and generating an abnormality detection signal; an abnormality detection signal transferring unit for transferring the abnormality detection signal along the route for the data transfer passing through the switch circuit corresponding to the abnormality detecting and informing unit containing the abnormality detection circuit which has generated the abnormality detection signal, in a direction opposite to the direction of the data transfer; and an abnormality informing unit for detecting, for each route for the data transfer, the generation of the abnormality detection signal by one of the abnormality detection circuits in the respective stages located along the route, generating an abnormality informing signal, and outputting the abnormality informing signal to the data processing apparatus which outputs the piece of connection request information requesting the route.

According to the third aspect of the present invention, in addition to the above construction of the second aspect of the present invention, identification of the stage at which the abnormality detection signal has been generated, may be maintained until the abnormality detection signal reaches the data processing apparatus.

DESCRIPTION OF THE PREFERRED EMBODIMENTS

Figure 1:
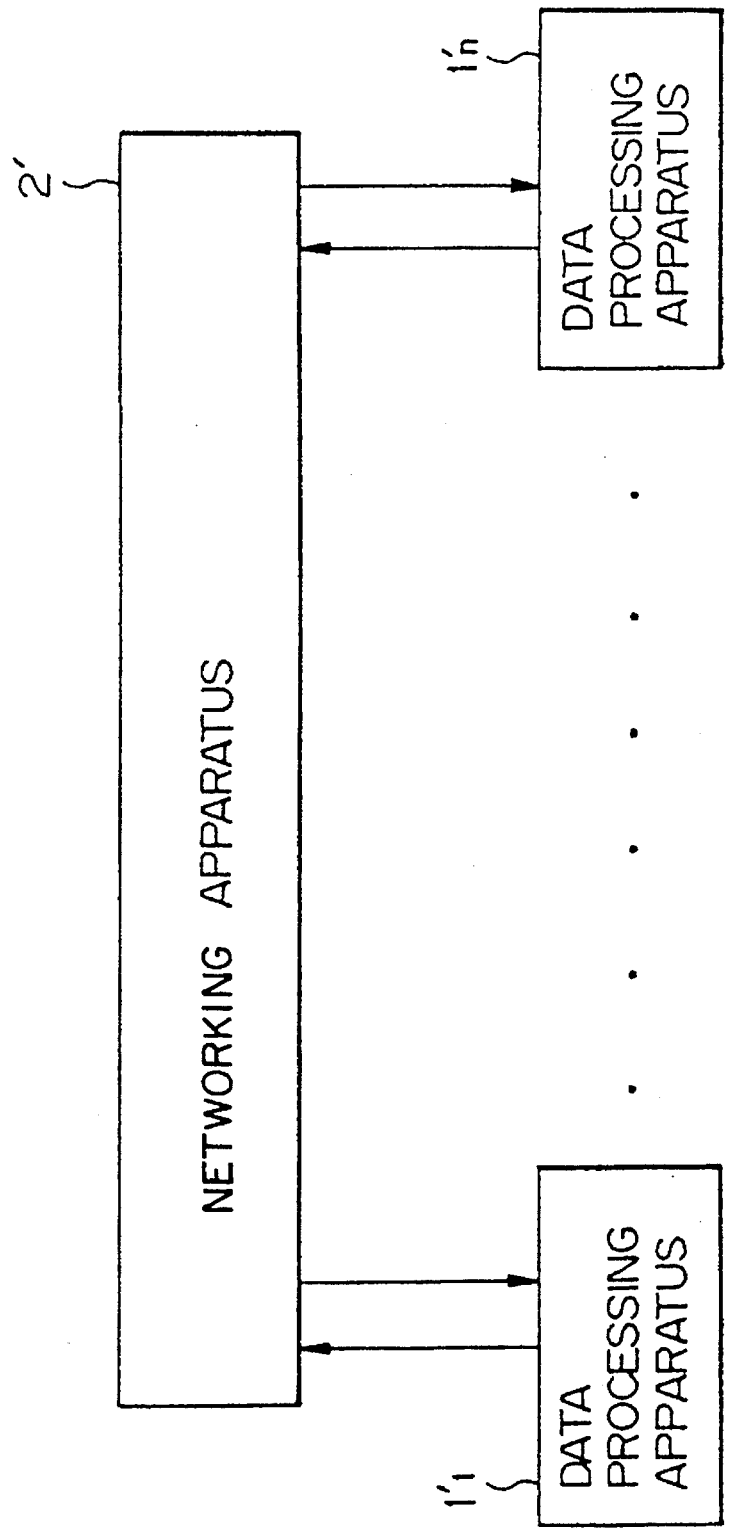
FIG. 1 is a diagram illustrating an outlined construction of a multiprocessor system to which the present invention is applied.

Multiprocessor System (FIG. 1)

FIG. 1 is a diagram illustrating an outlined construction of a multiprocessor system to which the present invention is applied. In FIG. 1, reference numerals $1_1'$ to $1_n'$ each denote a data processing apparatus, and 2' denotes a networking apparatus. The networking apparatus 2' receives a connection request containing information on the connection request, from one of a plurality of data processing apparatuses, and establishes a physical link (a route for a data transfer) between the data processing apparatus which sends the connection request to the networking apparatus, and another of the plurality of data processing apparatuses, which is indicated in the above information. Thus, the data transfer becomes possible between the data processing apparatuses through the above route, in accordance with an arbitrary protocol which is predetermined among the plurality of data processing apparatuses.

Figure 2:
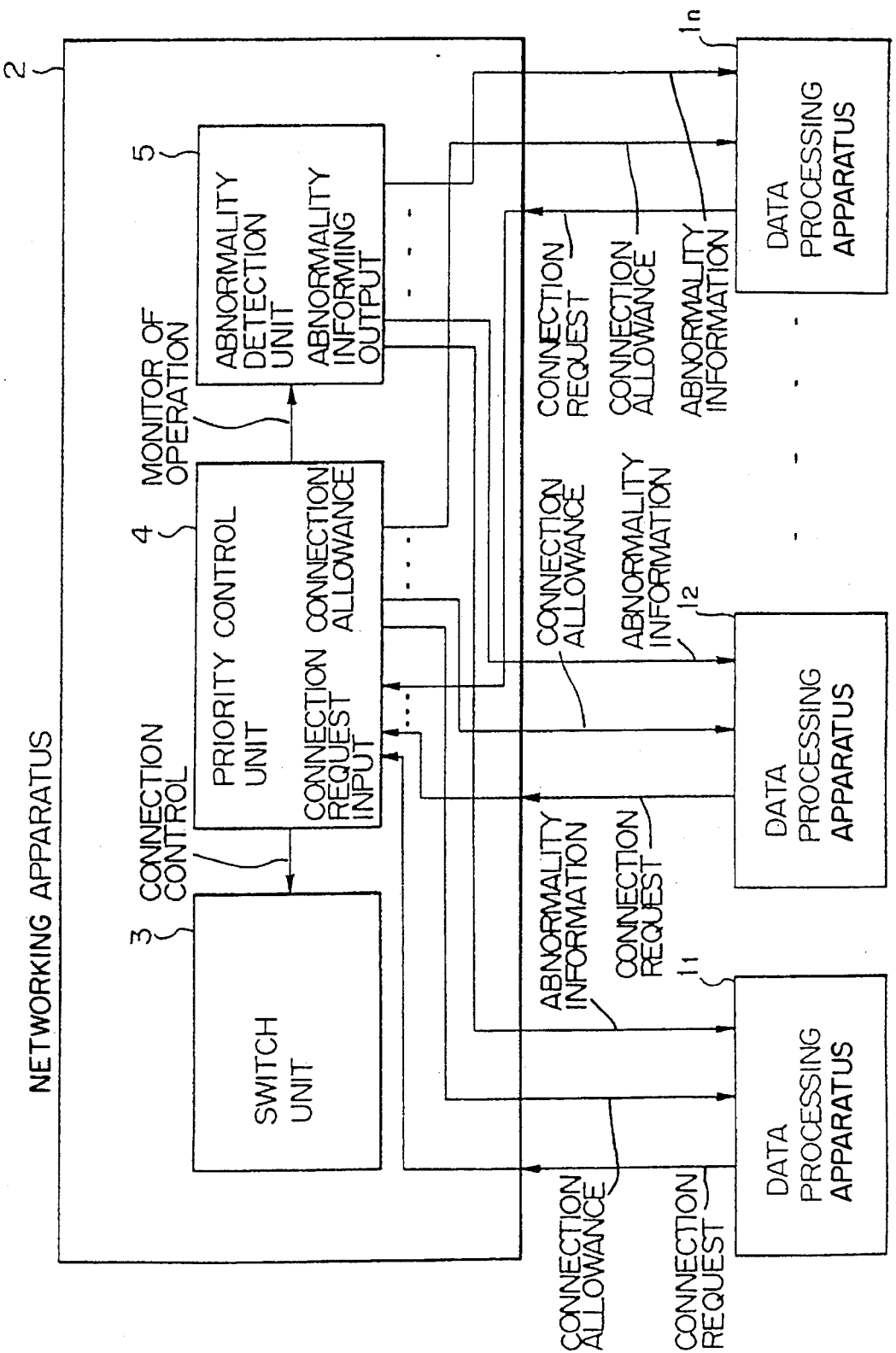
FIG. 2 is a diagram illustrating a basic construction of the present invention.

Basic Construction of First Aspect of Present Invention (FIG. 2)

(a) FIG. 2 is a diagram illustrating the basic construction of the first aspect of the present invention. In FIG. 2, reference numerals $1_1$ to $1_n$ each denote a data processing apparatus, 2 denotes a networking apparatus, 3 denotes a switch unit, 4 denotes a priority control unit, and 5 denotes an abnormality detecting unit. The primary function of the networking apparatus 2 is the same as the networking apparatus 2' in FIG. 1. In addition, the networking apparatus 2 contains the switch unit 3, the priority control unit 4, and the abnormality detecting unit 5, as indicated in FIG. 2.

The priority control unit 4 receives at least one piece of connection request information which is output from at least one of the plurality of data processing apparatuses $1_1$ to $1_n$ for requesting establishment of a route for a data transfer; determines, based on a predetermined priority order, at least one route which is requested by the at least one piece of connection request information, and which can be concurrently established in the switch unit 3; outputs at least one connection allowance signal to at least one of the plurality of data processing apparatuses; and controls the switch unit 3 so that the above at least one route is established in the switch unit 3.

Figure 3:
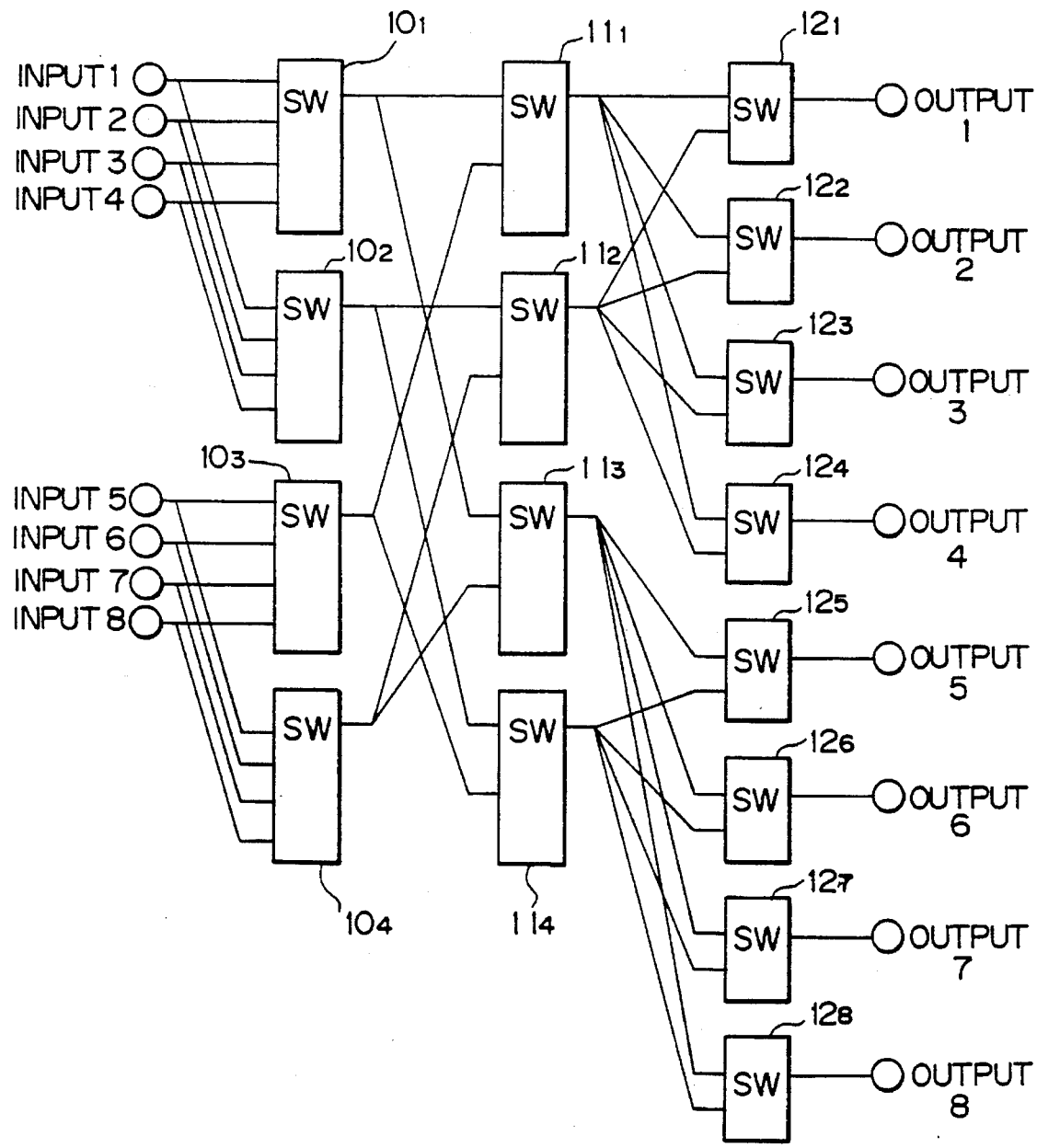
FIG. 3 is a diagram illustrating an example of an outlined construction of the networking apparatus.

The switch unit 3 establishes therein the above at least one route under the control of the priority control unit 4. In FIG. 3, the at least one route is not shown.

The abnormality detecting unit 5 monitors the above operation of the priority control unit 4; generates an abnormality informing signal when abnormality is detected in the operation of the priority control unit 4; and outputs the abnormality informing signal to the data processing apparatus which has output the above piece of connection request information.

Each of the above plurality of data processing apparatuses $1_1$ to $1_n$ comprises a connection request information output unit (not shown) for generating and outputting the piece of connection request information to the priority control unit 4 in the networking apparatus 2.

According to the first aspect of the present invention, the operation of the priority control unit 4 is monitored by the abnormality detecting unit 5. When an abnormality in the operation of the priority control unit 4 is detected, the abnormality detecting unit 5 generates an abnormality detection signal, and outputs the same to the data processing apparatus which outputs a piece of connection request information. Therefore, the data processing apparatus can be immediately informed of the abnormality in the operation of the priority control unit 4. Namely, it does not take long to detect the abnormality in the networking apparatus.

(b) The above piece of connection request information may include a connection request signal which indicates whether or not the data processing apparatus has a request for connection (establishment of a route for a data transfer to a requested one of the plurality of data processing apparatuses $1_1$ to $1_n$), and a piece of switch control information for controlling the switch unit 3 so that the switch unit 3 establishes the requested route in accordance with the piece of switch control information.

(c) In the case of (b), each of the plurality of data processing apparatuses $1_1$ to $1_n$ may contain a switch control information storage unit (not shown) for storing at least one piece of switch control information.

(d) In the case of (c), each of the plurality of data processing apparatuses $1_1$ to $1_n$ may contain a unit for reading one of the at least one piece of switch control information from the above switch control information storage unit, for establishing the route for a data transfer before performing the data transfer. Each of the plurality of data processing apparatus $1_1$ to $1_n$ may include the piece of switch control information read from the switch control information storage unit, in a piece of connection request information as described above, to output the piece of connection request information.

(e) In the case of (d), each of the plurality of data processing apparatuses $1_1$ to $1_n$ may contain an other information finding unit and an other information outputting unit. When the other information finding unit has received the abnormality informing signal in response to an output of a piece of switch control information to the networking apparatus 2, the other information finding unit determines whether or not another piece of switch control information for establishing another route to the same destination as that of the route requested by the above piece switch control information, is stored in the switch control information storage unit. When the above other piece of switch control information is determined to be stored in the switch control information storage unit, the other information outputting unit reads the piece of switch control information; includes the piece of switch control information in a piece of connection request information, and outputs the piece of connection request information.

(f) In the case of (b), the abnormality detecting unit 5 can detect as the abnormality a contradiction between an input and an output of the priority control unit 4.

(g) In the case of (f), the abnormality detecting unit 5 can detect as the above contradiction a condition that the priority control unit 4 does not output a connection allowance signal when the priority control unit 4 receives at least one piece of connection request information, and a condition that the priority control unit 4 outputs a connection allowance signal when the priority control unit 4 does not receive a piece of connection request information.

(h) In the case of (f), the abnormality detecting unit 5 may contain an abnormality detection signal generating unit for generating an abnormality detection signal indicating that the abnormality detecting unit 5 has detected the above contradiction; and a gate unit for receiving the abnormality detection signal and the above connection request signal, and outputting as the abnormality informing signal the abnormality detection signal only to one of the plurality of data processing apparatuses which outputs the connection request signal.

Second Aspect of the Present Invention (i) The second aspect of the present invention contains the following characteristic features in addition to the above features of the first aspect of the present invention. In the second aspect of the present invention, the switch unit 3 is comprised of a plurality of stages and each stage contains at least one switch circuit. That is, the switch unit 3 contains a plurality of switch circuits. Each switch circuit has at least one input port and at least one output port, and provides a first partial route which constitutes a portion of the above route for the data transfer, in the stage to which the switch circuit belongs.

Each piece of switch control information contained in each piece of connection request information, contains a plurality of pieces of partial switch control information to be used for controlling the switch units in respective stages which are on the route for the data transfer requested by the piece of connection request information.

The above priority control unit 4 contains a plurality of priority control circuits, provided for the respective switch circuits, each for controlling a corresponding one of the plurality of switch circuits so that the corresponding switch circuit in each stage establishes the first partial route according to a corresponding one of the plurality of pieces of partial switch control information.

The above abnormality detecting unit 5 contains a plurality of abnormality detecting and informing units, provided for the respective switch circuits. The abnormality detecting and informing unit contains:

an abnormality detection circuit for detecting an abnormality in the priority control circuit corresponding to each abnormality detecting and informing unit, and generating an abnormality detection signal;

an abnormality detection signal transferring unit for transferring the above abnormality detection signal along the above route for the data transfer passing through the switch circuit corresponding to the abnormality detecting and informing unit containing the abnormality detection circuit which has generated the abnormality detection signal, in a direction opposite to the direction of the data transfer; and an abnormality informing unit for detecting, for each route for the data transfer, the generation of the above abnormality detection signal by one of the abnormality detection circuits in the respective stages located along the route, generating an abnormality informing signal, and outputting the abnormality informing signal to the data processing apparatus which outputs the piece of connection request information requesting the above route.

According to the second aspect of the present invention, the abnormality detecting unit 5 comprises a plurality of abnormality detecting and informing units corresponding to a plurality of switch circuits, respectively. The abnormality detecting and informing unit detects an abnormality in the priority control circuit, corresponding to a switch circuit, by a corresponding abnormality detection circuit, and generates an abnormality detection signal. The abnormality detection signal is transferred by the abnormality detection signal transferring unit, along the route of data transfer passing through the switch circuit corresponding to the abnormality detecting and informing unit containing the abnormality detection circuit which detects the abnormality, in a direction opposite to the direction of the route the abnormality detection circuit in the abnormality detecting and informing unit provided corresponding to a respective switch circuit. Based on the transferred abnormality detection signal, the abnormality informing unit can detect, for each route of the data transfer, that one of the abnormality detection circuits located in the plurality of stages along the route has detected an abnormality. When the abnormality informing unit detects, for a route of the data transfer, that one of the abnormality detection circuits located in the plurality of stages along the route, has detected the abnormality, the abnormality informing unit generates an abnormality informing signal, and outputs the same to the one of the plurality of data processing apparatuses which has output the connection request information requesting the route. Therefore, the data processing apparatus can be immediately informed of in which route in the networking apparatus the abnormality has been detected. Namely, it does not take long to detect an abnormality in the networking apparatus.

(j) In an embodiment of the second aspect of the present invention, the networking apparatus 2 contains a connection request information switch circuit, provided for each of the switch circuits in the stages other than the final stage, for connecting an input port thereof with an output port thereof in the same manner as the corresponding switch circuit connecting the input port thereof with the output port thereof, to form a second partial route for transferring a piece of the connection request information, so that the piece of connection request information can be supplied to the priority control circuit corresponding to the switch circuit located along each route, and the connection request signal can be supplied to the abnormality detecting and informing unit corresponding to the priority control circuit;

the connection request information output from the above data processing apparatus is supplied to the priority control circuit in the first stage, and is then supplied to the priority control circuit corresponding to the switch circuit in each stage located along each route for the data transfer, through the second partial route provided by the connection request information switch circuit;

the above connection request signal, in the connection request information output from the above data processing apparatus is supplied to the abnormality detecting and informing unit in the first stage, and is then supplied to the abnormality detecting and informing unit corresponding to the switch circuit in each stage located along each route for the data transfer, through the connection request information switch circuit;

the networking apparatus 2 further contains a connection allowance signal switch circuit, provided for each connection request information switch circuit, for providing a third partial route in the direction opposite to the direction of the second partial route provided by the corresponding connection request information switch circuit, so that a partial connection allowance signal output from a priority control circuit in the following stage(s), is transferred, in the direction opposite to the direction of the piece of connection request information, to the priority control circuit in the preceding stage, along the route for supplying the piece of connection request information to the priority control circuit corresponding to the switch circuit in each stage located along each route for the data transfer;

the above priority control circuit 22 in the stages other than the first and final stages, receives the piece of connection request information and the partial connection allowance signal output from the priority control circuit in the following stage(s) through the connection allowance signal switch circuit; determines, as the first partial route in the switch circuit corresponding to the priority control circuit, one of candidates for the first partial route in the switch circuit corresponding to the priority control circuit, when the one of the candidates for the first partial route is requested by the partial switch control information in the piece of the connection request information, and can be concurrently established in the switch circuit, and the partial connection allowance signal for the one of the candidates for the first partial route is received from the priority control circuit in the following stage(s) located along a route for the data transfer containing the one of the candidates for the first partial route; controls the corresponding switch circuit, the corresponding connection request signal switch circuit, and the corresponding connection allowance signal switch circuit, so that the above determined first partial route is established in the corresponding switch circuit, the second partial route is established in the connection request signal switch circuit corresponding to the switch circuit in the same manner as the first partial route, and the third partial route in the direction opposite to the second partial route is established in the connection allowance signal switch circuit corresponding to the connection request signal switch circuit; and outputs the partial connection allowance signal corresponding to the above first partial route;

the priority control circuit in the final stage receives the above piece of connection request information; determines, as the first partial route in the switch circuit in the final stage, one of candidates for the first partial route in the switch circuit in the final stage, when the one of the candidates for the first partial route can be concurrently established in the switch circuit and requested by the piece of partial switch control information for controlling the switch circuit in the final stage, included in the piece of connection request information; controls the switch circuit so that the above candidate for the first partial route is established in the switch circuit in the final stage; and outputs the partial connection allowance signal to a priority control circuit in the preceding stage located along a route containing the first partial route;

the above priority control circuit 22 in the first stage receives the above piece of connection request information and the partial connection allowance signal output from the priority control circuit in the following stage(s) through the connection allowance signal switch circuit; determines, as the first partial route in the switch circuit in the first stage, one of candidates for the first partial route in the switch circuit, which is requested by the partial switch control information in the piece of the connection request information, and can be concurrently established in the switch circuit, and the partial connection allowance signal for the above one of the candidates for the first partial route is received from the priority control circuit in the following stage(s) located along a route for the data transfer containing the above one of the candidates for the first partial route; controls the corresponding switch circuit, the corresponding connection request signal switch circuit, and the corresponding connection allowance signal switch circuit, so that the above determined first partial route is established in the corresponding switch circuit, the second partial route is established in the connection request signal switch circuit corresponding to the switch circuit in the same manner as the first partial route, and the third partial route in the direction opposite to the second partial route is established in the connection allowance signal switch circuit corresponding to the connection request signal switch circuit; and outputs the partial connection allowance signal corresponding to the above first partial route, to one of the data processing apparatuses which outputs the piece of connection request information requesting the route containing the above determined first partial route;

each of the above abnormality detecting and informing unit in the final stage comprises a plurality of abnormality informing gates, each provided corresponding to one of the input ports of the switch circuit corresponding to the abnormality detecting and informing unit; receiving the connection request signal included in the piece of connection request information requesting a route containing the first partial route starting at the corresponding input port, and the abnormality detection signal generated by the abnormality detection circuit in the abnormality detecting and informing unit; and outputting as a partial abnormality informing signal the abnormality detection signal to an abnormality detecting and informing unit in the preceding stage only when the connection request signal is active;

the networking apparatus comprises, for each stage in each route of the data transfer, an abnormality informing signal switch circuit, provided corresponding to each connection allowance signal switch circuit, for establishing a fourth partial route connecting an input port with an output port of the abnormality informing signal switch circuit in the same manner as the corresponding connection by the third route in the connection allowance signal switch circuit, so that a partial abnormality informing signal output from an abnormality detecting and informing unit in the following stage(s) is transferred to the priority control circuit corresponding to the switch circuit establishing the first partial route in the stage in the route;

each abnormality detecting and informing unit in stages other than the final stage comprises an OR gate for receiving as a first abnormality detection signal the abnormality detection signal generated by the abnormality detection circuit in the abnormality detecting and informing unit, receiving as second abnormality detection signal the abnormality detection signal transferred from the abnormality detecting and informing unit in the following stage(s) through the fourth partial route in the abnormality informing signal switch circuit; and obtaining and outputting a logical sum of the first and second abnormality detection signals;

each abnormality detecting and informing unit in stages other than the first and final stages, comprises a plurality of first abnormality informing signal gates, each provided corresponding to one of the input ports of the corresponding switch circuit, for receiving the connection request signal included in the piece of connection request information requesting the route starting at the corresponding input port and containing the first partial route, and the logical sum output from the OR gate; and outputting as another partial abnormality informing signal the logical sum to the abnormality detecting and informing unit in the preceding stage only when the connection request signal is active; and each of abnormality detecting and informing unit in the first stage comprises a plurality of second abnormality informing signal gates, each provided corresponding to one of the input ports of the switch circuit corresponding to the abnormality detecting and informing unit; for receiving the connection request signal included in the piece of connection request information requesting the route starting at the corresponding input port and containing the first partial route, and the logical sum output from the OR gate; and outputting as another partial abnormality informing signal the logical sum to one of the data processing apparatuses which outputs the piece of connection request information only when the connection request signal is active.

Third Aspect of the Present Invention (k) The third aspect of the present invention contains the following characteristic features in addition to the above features of the first aspect of the present invention. In the third aspect of the present invention, the switch unit 3 is comprised of a plurality of stages and each stage contains at least one switch circuit. That is, the switch unit 3 contains a plurality of switch circuits. Each switch circuit has at least one input port and at least one output port, and provide a first partial route which constitutes a portion of the above route for the data transfer, in the stage to which the switch circuit belongs.

Each piece of switch control information contained in each piece of connection request information, contains a plurality of pieces of partial switch control information to be used for controlling the switch units in respective stages which are on the route for the data transfer requested by the piece of connection request information.

The above priority control unit 4 contains a plurality of priority control circuits, provided for the respective switch circuits, each for controlling a corresponding one of the plurality of switch circuits so that the corresponding switch circuit in each stage establishes the first partial route according to a corresponding one of the plurality of pieces of partial switch control information.

The above abnormality detecting unit 5 contains an abnormality detecting and informing unit, provided for each of the above switch circuits. The abnormality detecting and informing unit contains:

an abnormality detection circuit for detecting an abnormality in the priority control circuit corresponding to abnormality detecting and informing unit, and generating an abnormality detection signal;

an abnormality detection signal transferring unit for transferring the above abnormality detection signal along the above route for the data transfer passing through the switch circuit corresponding to the abnormality detecting and informing unit containing the abnormality detection circuit which has generated the abnormality detection signal, in a direction opposite to the direction of the data transfer, maintaining identification of the stage at which the abnormality detection signal has been generated; and an abnormality informing unit for detecting, for each route for the data transfer and for each switch circuit, the generation of the above abnormality detection signal by a corresponding one of the abnormality detection circuits corresponding to the switch circuit, located along the route, generating an abnormality informing signal, and outputting the abnormality informing signal to the data processing apparatus.

According to the third aspect of the present invention, the abnormality detecting unit 5 comprises a plurality of abnormality detecting and informing units corresponding to a plurality of switch circuits, respectively. The abnormality detecting and informing unit detects abnormality in the priority control circuit corresponding to a switch circuit by a corresponding abnormality detection circuit, and generates an abnormality detection signal. The abnormality detection signal for each priority control circuit is transferred by the abnormality detection signal transferring unit, along the route of data transfer passing through the switch circuit corresponding to the abnormality detecting and informing unit containing the abnormality detection circuit which detects the abnormality, in a direction opposite to the direction of the route, maintaining identification of the stage at which the abnormality detection signal has been generated. Based on the transferred abnormality detection signal, the abnormality informing unit can detect, for each route of the data transfer and for each stage, that the abnormality detection circuit located in the stage along the route, has detected the abnormality. When the abnormality informing unit detects, for a route of the data transfer and for a stage, that the abnormality detection circuit located in the stage along the route, has detected the abnormality, the abnormality informing unit generates an abnormality informing signal, and outputs the same to one of the plurality of data processing apparatuses which outputs the connection request information requesting the route. Therefore, the data processing apparatus can be immediately informed of in which priority control circuit in the networking apparatus the abnormality has been detected. Namely, it does not take long to detect an abnormality in the networking apparatus.

(1) In an embodiment of the third aspect of the present invention, the networking apparatus 2 contains a connection request information switch circuit, provided for each of the switch circuits in the stages other than the final stage, for connecting an input port thereof with an output port thereof in the same manner as the corresponding switch circuit connecting the input port thereof with the output port thereof, to form a second partial route for transferring a piece of the connection request information, so that the piece of connection request information can be supplied to the priority control circuit corresponding to the switch circuit located along each route, and the connection request signal can be supplied to the abnormality detecting and informing unit corresponding to the priority control circuit;

the connection request information output from the above data processing apparatus, is supplied to the priority control circuit in the first stage, and is then supplied to the priority control circuit corresponding to the switch circuit in each stage located along each route for the data transfer, through the second partial route provided by the connection request information switch circuit;

the above connection request signal in the connection request information output from the above data processing apparatus, is supplied to the abnormality detecting and informing unit in the first stage, and is then supplied to the abnormality detecting and informing unit corresponding to the switch circuit in each stage located along each route for the data transfer, through the connection request information switch circuit;

the networking apparatus 2 further contains a connection allowance signal switch circuit, provided for each connection request information switch circuit, for providing a third partial route in the direction opposite to the direction of the second partial route provided by the corresponding connection request information switch circuit, so that a partial connection allowance signal output from a priority control circuit in the following stage(s), is transferred, in the direction opposite to the direction of the piece of connection request information, to the priority control circuit in the preceding stage, along the route for supplying the piece of connection request information to the priority control circuit corresponding to the switch circuit in each stage located along each route for the data transfer;

the above priority control circuit 22 in the stages other than the first and final stages, each receive the piece of connection request information and the partial connection allowance signal output from the priority control circuit in the following stage(s) through the connection allowance signal switch circuit; determines, as the first partial route in the switch circuit corresponding to the priority control circuit, one of candidates for the first partial route in the switch circuit corresponding to the priority control circuit, when the one of the candidates for the first partial route is requested by the partial switch control information in the piece of the connection request information, and can be concurrently established in the switch circuit, and the partial connection allowance signal for the one of the candidates for the first partial route is received from the priority control circuit in the following stage(s) located along a route for the data transfer containing the one of the candidates for the first partial route; controls the corresponding switch circuit, the corresponding connection request signal switch circuit, and the corresponding connection allowance signal switch circuit, so that the above determined first partial route is established in the corresponding switch circuit, the second partial route is established in the connection request signal switch circuit corresponding to the switch circuit in the same manner as the first partial route, and the third partial route in the direction opposite to the second partial route is established in the connection allowance signal switch circuit corresponding to the connection request signal switch circuit; and outputs the partial connection allowance signal corresponding to the above first partial route;

the priority control circuit in the final stage receives the above piece of connection request information; determines, as the first partial route in the switch circuit in the final stage, one of candidates for the first partial route in the switch circuit in the final stage, when the one of the candidates for the first partial route can be concurrently established in the switch circuit and requested by the piece of partial switch control information for controlling the switch circuit in the final stage, included in the piece of connection request information; controls the switch circuit so that the above candidate for the first partial route is established in the switch circuit in the final stage; and outputs the partial connection allowance signal to a priority control circuit in the preceding stage located along a route containing the first partial route;

the above priority control circuit 22 in the first stage receives the above piece of connection request information and the partial connection allowance signal output from the priority control circuit in the following stage(s) through the connection allowance signal switch circuit; determines, as the first partial route in the switch circuit in the first stage, one of candidates for the first partial route in the switch circuit, which is requested by the partial switch control information in the piece of the connection request information, and can be concurrently established in the switch circuit, and the partial connection allowance signal for the above one of the candidates for the first partial route is received from the priority control circuit in the following stage(s) located along a route for the data transfer containing the above one of the candidates for the first partial route; controls the corresponding switch circuit, the corresponding connection request signal switch circuit, and the corresponding connection allowance signal switch circuit, so that the above determined first partial route is established in the corresponding switch circuit, the second partial route is established in the connection request signal switch circuit corresponding to the switch circuit in the same manner as the first partial route, and the third partial route in the direction opposite to the second partial route is established in the connection allowance signal switch circuit corresponding to the connection request signal switch circuit; and outputs the partial connection allowance signal corresponding to the above first partial route, to one of the data processing apparatuses which outputs the piece of connection request information requesting the route containing the above determined first partial route;

each of the above abnormality detecting and informing unit in the final stage comprises a plurality of abnormality informing gates, each provided corresponding to one of the input ports of the switch circuit corresponding to the abnormality detecting and informing unit; receiving the connection request signal included in the piece of connection request information requesting a route starting at the corresponding input port and containing the first partial route, and the abnormality detection signal generated by the abnormality detection circuit in the abnormality detecting and informing unit; and outputting as a partial abnormality informing signal the abnormality detection signal to an abnormality detecting and informing unit in the preceding stage only when the connection request signal is active;

the networking apparatus comprises, for each stage in each route of the data transfer, an abnormality informing signal switch circuit, provided corresponding to each connection allowance signal switch circuit, for establishing, for each partial abnormality informing signal output from an abnormality detecting and informing unit in the following stages, a fourth partial route connecting an input port with an output port of the abnormality informing signal switch circuit in the same manner as the corresponding connection by the third route in the connection allowance signal switch circuit, so that a partial abnormality informing signal output from an abnormality detecting and informing unit in the following stage(s) is transferred to the priority control circuit corresponding to the switch circuit establishing the first partial route in the stage in the route;

each abnormality detecting and informing unit in stages other than the first and final stages comprises a second plurality of abnormality information gates, corresponding to a corresponding input port of the switch circuit corresponding to the abnormality detecting and informing unit, for receiving the connection request signal containing the piece of connection request information requesting a route containing the first partial route starting at the input port, the abnormality detection signal generated by the abnormality detection circuit in each abnormality detecting and informing unit, and one or more partial abnormality informing signals output from an abnormality detecting and informing unit in the following stage(s) through the fourth route in the abnormality informing signal switch circuit; and outputting as a plurality of partial abnormality informing signals from the abnormality detecting and informing unit, the abnormality detection signal and the one or more abnormality informing signals being sent in parallel, to an abnormality detecting and informing unit in the preceding stage, only when the connection request signal is active; and each of abnormality detecting and informing unit in the first stage comprises a third plurality of abnormality informing signal gates, each provided corresponding to one of the input ports of the switch circuit corresponding to the abnormality detecting and informing unit; for receiving the connection request signal included in the piece of connection request information requesting the route containing the first partial route starting at the corresponding input port, the abnormality detection signal generated by the abnormality detection circuit in each abnormality detecting and informing unit, and one or more partial abnormality informing signals output from an abnormality detecting and informing unit in the following stage(s) through the fourth route in the abnormality informing signal switch circuit; and outputting as a plurality of partial abnormality informing signals from the abnormality detecting and informing unit, the abnormality detection signal and the one or more abnormality informing signals being sent in parallel, to one of the data processing apparatuses which outputs the piece of connection request information, only when the connection request signal is active.

Networking Apparatus (FIG. 3)

FIG. 3 is a diagram illustrating an example of an outlined construction of the networking apparatus. The networking apparatus of FIG. 3 has three stages of switch units, eight input ports, and eight output ports. In FIG. 3, $10_1$ to $10_4$ each denote a switch unit in the first stage, $11_1$ to $11_4$ each denote a switch unit in the second stage, and $12_1$ to $12_4$ each denote a switch unit in the final stage. In FIG. 3, only routes for data transfer are indicated by lines connected between input ports and switch units in the first stage, between the switch units in the adjacent stages, and between the switch units in the final stage and the output ports. The flows of the control signals are explained later with reference to FIG. 4.

Figure 4:
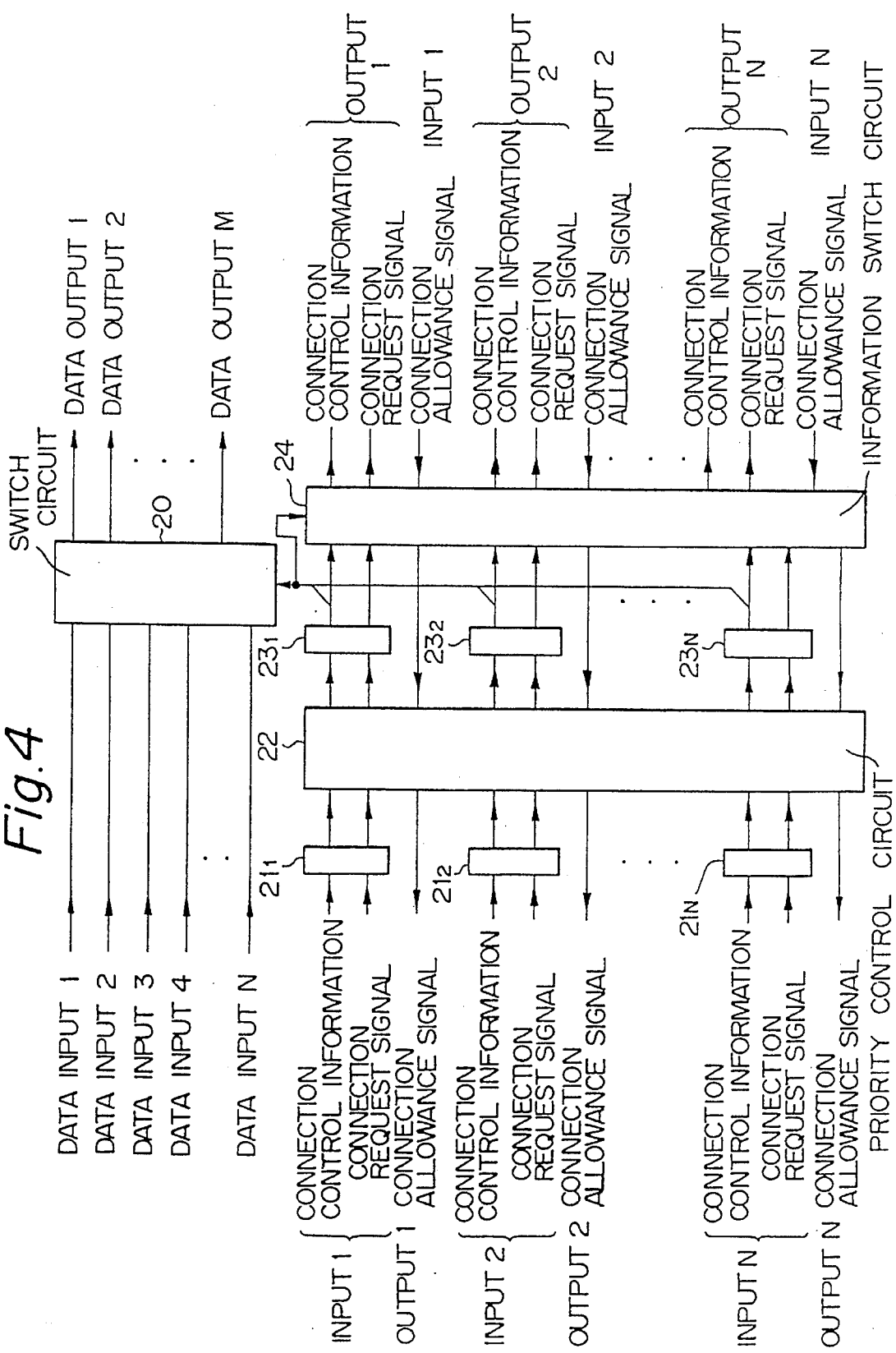
FIG. 4 is a diagram illustrating an example construction of the switch unit which is used in stages other than the final stage in a networking apparatus having a structure, for example, as indicated in FIG. 1.

Switch Unit in Stages Other than Final Stage (FIG. 4)

FIG. 4 is a diagram illustrating an example construction of the switch unit which is used in stages other than the final stage in a networking apparatus having a structure, for example, as indicated in FIG. 1. In FIG. 4, reference numeral 20 denotes a switch circuit, $21_1, 21_2, \ldots 21_N$ each denote a register on the request input side, 22 denotes a priority control circuit, $23_1, 23_2, \ldots 23_N$ each denote a register on the allowance output side, and 24 denotes an information switch circuit.

The switch circuit 20 provides a plurality of routes (paths) for data transfer operations between a plurality of data processing apparatuses. As explained below, the switch circuit 20 is controlled by a group of pieces of partial information to be used for controlling the switch circuit 20, among pieces of connection request information corresponding to connection request signals allowed by the priority control circuit 22. The switch circuit 20 in FIG. 4 comprises N data input ports and M data output ports, and can simultaneously establish a route connecting each of the N data input ports with the respectively corresponding one of the M data output ports. For example, in the case wherein the construction of FIG. 4 is one of the switch units in the first stage, the N data input ports of the switch circuit 20 are respectively connected to a plurality of data output ports (not shown) of a plurality of data processing apparatuses, and the M data output ports are respectively connected to one or more of the data input ports of one of the switch units in the second stage. Such a switch circuit can be easily constructed by combining a plurality of selector circuits in a plurality of stages. In this case, the above control of switch circuit means control of the selector circuits in the switch circuit 20.

Each of the data processing apparatuses (processors) stores in a memory (not shown) provided therein, a list of pieces of connection control information to be supplied to the networking apparatus for establishing routes for transferring data to the other data processing apparatuses, respectively. The respective piece of connection control information indicates what control information is to be transferred to the respective switch units in the respective stages of the networking apparatus. For example, in the case wherein the networking apparatus is constituted by three stages as indicated in FIG. 3, the connection control information may contain: (a piece of control information to be transferred to the switch circuit 20 in a switch unit in the first stage); (a piece of control information to be transferred to the switch circuit 20 in a switch unit in the second stage); and (a piece of control information to be transferred to the switch circuit 20 in a switch unit in the final stage). Generally, more than one route may be established from one data processing apparatus to each data processing apparatus, and therefore, more than one piece of such connection control information may be stored for each address (data processing apparatus), in the above memory.

When one of the data processing apparatuses is required to transfer data to another data processing apparatus, the data processing apparatus on the sending side reads one piece of the connection control information for a route to the above other data processing apparatus, from the above list, and transfers the set of connection control information together with a connection request signal, through a corresponding one of the data input ports of a switch unit to which the data processing apparatus on the sender side is connected. In the case wherein the construction of FIG. 4 is one of the switch units in the first stage, the plurality of registers $21_1, 21_2, \ldots 21_N$ on the request input side, which are provided on the request input side of the priority control circuit 22, are respectively connected to the output ports for the connection control information and the connection request signals, in the respectively corresponding data processing apparatuses. The plurality of plurality of registers $21_1, 21_2, \ldots 21_N$ on the request input side, is provided corresponding to the data input ports of the switch circuit 20. Thus, the connection control information and the connection request signals from the data processing apparatus (on the sender side) are respectively latched in the plurality of registers $21_1, 21_2, \ldots 21_N$ on the request input side of the priority control circuit 22, and are applied to the priority control circuit 22.

Generally, more than one data processing apparatus may simultaneously apply a plurality of connection request signals and a plurality of pieces of connection control information accompanying the respective connection request signals, to the plurality of registers $21_1, 21_2, \ldots 21_N$ on the request input side. The priority control circuit 22 receives the above-mentioned pieces of partial information included in the pieces of connection control information accompanying the connection request signals, and simultaneously gives allowances to the connection request signals corresponding to the pieces of connection control information when the above pieces of partial information in the connection control information indicate requests for routes which can be simultaneously established by the switch circuit 20, or gives an allowance to one of the connection request signals corresponding to the pieces of connection control information when the above pieces of partial information in the connection control information indicates requests for routes which cannot be simultaneously established by the switch circuit 20. The above one of the connection request signals is determined based on a predetermined priority order, taking into consideration a condition that an allowance is obtained for the piece of connection control information corresponding to the connection request signal, in a switch unit in all of the following stage(s), as explained later.

On the output side of the priority control circuit 22, a plurality of registers $23_1, 23_2, \ldots 23_N$ on the allowance output side, are provided corresponding to the plurality of registers on the input side of the priority control circuit 22. The connection request signal allowed by the priority control circuit 22 and the accompanying piece of connection control information pass through the priority control circuit 22, and are latched in the corresponding one of the registers $23_1, 23_2, \ldots 23_N$ on the allowance output side.

The priority control circuit receives a plurality of connection requests, and outputs an allowance to one of the connection requests in accordance with a predetermined priority order when the plurality of requests conflict. Since various constructions are known for realizing such a priority control circuit, details of the construction of the priority control circuit are not shown here.

Thus, the connection request signals and accompanying piece of connection control information are output from the respectively corresponding registers $23_1, 23_2, \ldots 23_N$ on the allowance output side. The above-mentioned pieces of partial information to be used for controlling the switch circuit 20, included in the pieces of connection control information, are branched, and are applied to the control input terminals of the switch circuit 20. Thus, the switch circuit 20 can be controlled by the control information allowed by the priority control circuit 22 so that the routes according to the control information allowed by the priority control circuit 22 are established in the switch circuit 20.

The above pieces of partial information applied to the switch circuit 20, are also applied to the information switch circuit 24 for controlling the information switch circuit 24. The information switch circuit 24 has a construction similar to the construction of the switch circuit 20. The switch circuit 20 is provided for providing the routes for transferring data, while the information switch circuit 24 is provided for transferring connection request signals and pieces of connection control information used for establishing the routes for the data transfer in the switch circuit 20, located along the respectively corresponding routes for the data transfer in the same directions as those of the corresponding data transfer operations, and for transferring connection allowance signals which are returned from the switch unit in the following stages, along the above routes in the directions opposite to those of the corresponding data transfer operations. Therefore, switching in the switch circuit 20 and the information switch circuit 24 are performed in the same manner and at the same timing. The output of each of the registers $23_1, 23_2, \ldots 23_N$ in the above switch unit is applied to a corresponding input terminal of a register provided on the request input side of a priority control circuit in another switch unit which contains another switch circuit to which the output data of the switch circuit 20 of the above switch unit is applied.

The above connection allowance signal indicates whether or not a route is allowed (established) in all of the following stage(s) in response to a corresponding connection request signal and an accompanying piece of connection control information. When a route is allowed (established) in all of the following stage(s) in response to a corresponding connection request signal and an accompanying piece of connection control information, the connection allowance signal is active.

Each of the above connection allowance signals, returned from a switch unit in the following stage(s), is input from a corresponding input terminal of the priority control circuit 22 through the information switch circuit 24. The priority control circuit 22 recognizes whether or not a route is allowed (established) in all of the following stage(s) in response to a corresponding connection request signal and an accompanying piece of connection control information, based on whether or not the connection allowance signal is active. A priority control circuit in each of the switch unit in the following stage(s), operates in the same way as the above explained priority control circuit 22 of FIG. 4. In order to determine whether or not a route corresponding to a connection request signal which is allowed in the priority control circuit 22, is allowed (established) in all of the following stage(s) in response to a corresponding connection request signal and an accompanying piece of connection control information, the priority control circuit 22 transfers connection request signals allowed therein and pieces of connection control information accompanying the allowed connection request signals to the switch units in the following stage(s), and receives corresponding connection allowance signals returned from the switch units in the following stage(s). An allowance to a connection request signal corresponding to which an active connection allowance signal is received from the following stage(s), is confirmed. An allowance to a connection request signal corresponding to which an inactive connection allowance signal is received from the following stage(s), is not confirmed, and then, the priority control circuit 22 stops the output therefrom of the connection request signal which is not confirmed, and a piece of connection control information accompanying the connection request signal. When the priority control circuit 22 receives one or more other connection request signal which has not been allowed by the priority control circuit 22, the priority control circuit 22 gives an allowance to one of such connection request signals having the highest priority among the connection request signals, according to the predetermined priority order. Thus, the newly allowed connection request signal and a piece of connection control information accompanying the allowed connection request signal, are output from the priority control circuit 22, instead of the above connection request signal which is not confirmed by the connection allowance signal from the following stage(s) and the accompanying piece of connection control information. Then, the confirmation of the allowance by the connection allowance signal from the following stage(s) is performed for the new connection request signal and the accompanying connection control information.

When each route is established by the above operations in the priority control circuit 2, the priority control circuit 22 generates a connection allowance signal, and outputs the same from a corresponding connection allowance signal output terminal, which is provided on the request input side of the priority control circuit 22. In the case wherein the switch unit of FIG. 4 is not in the first stage, the output of the connection allowance signal is applied to a connection allowance signal input terminal of the information switch circuit 24 in the corresponding switch unit in the preceding stage. In the case wherein the switch unit of FIG. 4 is in the first stage, the output of the connection allowance signal is transferred to the data processing apparatus which outputs the connection request signal corresponding to the connection allowance signal. The connection allowance signal transferred to the data processing apparatus which outputs the connection request signal corresponding to the connection allowance signal, indicates that "a physical link in response to the connection request signal is established in the networking apparatus." The data processing apparatus can start the operation of transferring data in accordance with a predetermined protocol when the connection allowance signal is received.

Figure 5:
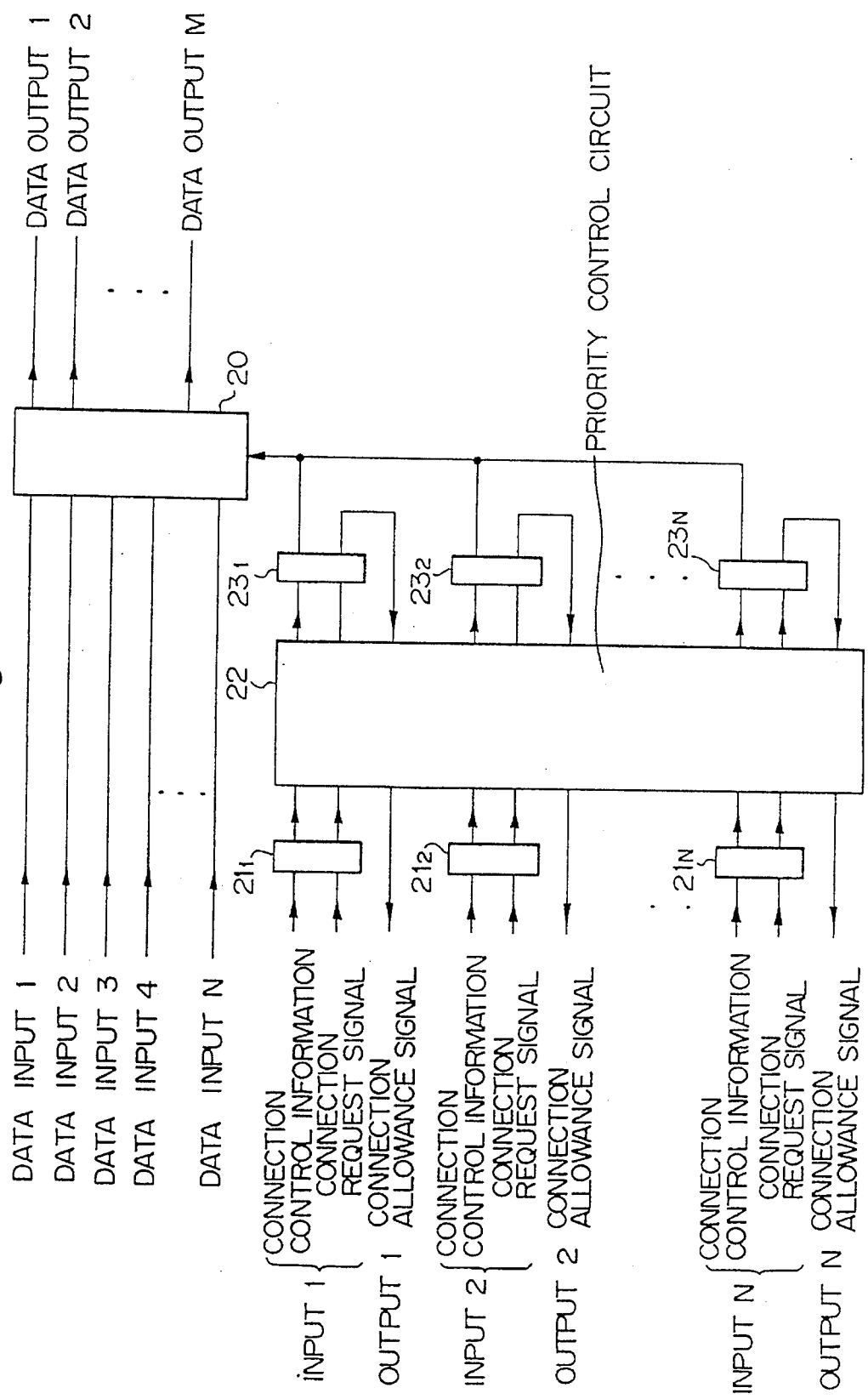
FIG. 5 is a diagram illustrating an example construction of the switch unit to be used in the final stage in the networking apparatus having a structure, for example, as indicated in FIG. 1.

Switch Unit in Final Stage (FIG. 5)

FIG. 5 is a diagram illustrating an example construction of the switch unit to be used in the final stage in the networking apparatus having a structure, for example, as indicated in FIG. 1. Since there is no transfer operation of connection request signals and the connection control information to the following stage(s), and no receipt of the connection allowance signals in a switch unit in the final stage, the information switch circuit 24 (FIG. 4) is unnecessary. The connection request signals allowed by the priority control circuit 22 in the switch unit of the final stage, are directly applied to the connection allowance signal input terminals of the priority control circuit 22.

The data outputs of the switch circuit 20 in the switch unit in the final stage, are respectively connected to data input ports (not shown) of the corresponding data processing apparatuses which are destinations of the routes established in the networking apparatus.

Detection and Informing of Abnormality (FIGS. 6 to 10)

The constructions for detecting and informing of abnormality in the priority control circuits in the respective switch units in the networking apparatus, are explained below. A construction (FIG. 6) for generating and transferring an abnormality informing signal in a switch unit in the final stage, two types of constructions (FIGS. 7 to 9) for generating and transferring an abnormality informing signal in switch units in the first and second (intermediate) stages, and a construction (FIG. 10) for detecting abnormality in a priority control circuit, are explained.

In FIGS. 5 to 9, the constructions on the output side of the priority control circuit are not indicated, since they are indicated in FIGS. 4 and 5. In addition, references J, L, M, N, P, R, S, and T used in FIGS. 6 to 9, for indicating the numbers of inputs and outputs, may be respectively arbitrary numbers.

Figure 6:
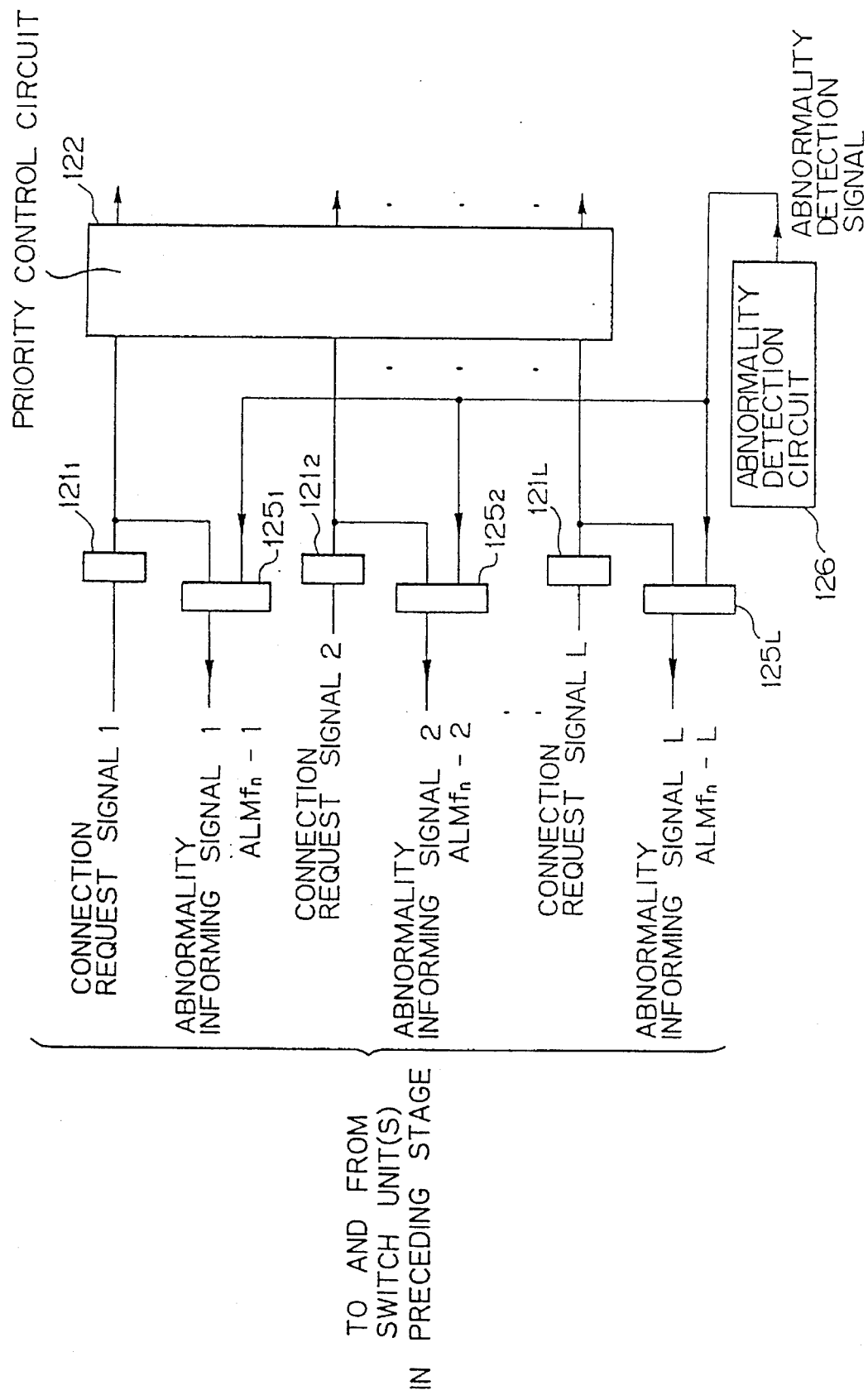
FIG. 6 is a diagram illustrating an example construction of the switch unit to be used in the final stage in the first and second embodiments of the networking apparatus, for detecting and informing of abnormality.

FIG. 6 is a diagram illustrating an example construction of the switch unit to be used in the final stage in the first and second embodiments of the networking apparatus, for detecting and informing of abnormality. In FIG. 6: reference numerals $121_1$ to $121_L$ each denote a register on the request input side, as indicated by $21_1$ to $21_N$ in FIG. 5; 122 denotes a priority control circuit, as indicated by 22 in FIG. 5; $125_1$ to $125_L$ denote a plurality of AND gates respectively provided corresponding to the registers $121_1$ to $121_L$ on the request input side, and 126 denotes an abnormality detection circuit.

The abnormality detection circuit 126 detects an abnormality in the operation of the priority control circuit 122 in the switch unit. The detailed construction of the abnormality detection circuit 126 is explained later with reference to FIG. 10.

When the abnormality detection circuit 126 detects an abnormality in the operation of the priority control circuit 122 in the switch unit, the abnormality detection circuit 126 outputs an active abnormality detection signal. The output of the abnormality detection circuit 126 is applied to one of input terminals of each of the plurality of AND gates $125_1$ to $125_L$. The above-mentioned connection request signals output from the registers $121_1$ to $121_L$ on the request input side, are applied to the other input terminals of the respective AND gates $125_1$ to $125_L$. The outputs (abnormality informing signals) ALMfn-1, ALMfn-2, . . . ALMfn-N of the plurality of AND gates $125_1$ to $125_n$, are respectively transferred, as abnormality informing signals from the final stage, to switch units in the preceding stage, which supply the corresponding connection request signals to the registers $121_1$ to $121_L$ on the request input side. Each of the above abnormality informing signals ALMfn-1, ALMfn-2, . . . ALMfn-N is applied to an abnormality informing signal input ports (explained later with reference to FIG. 7) corresponding to an output port in an information switch circuits 24 in a switch unit in the preceding stage, which output port outputs the connection request signal corresponding to the abnormality informing signal. Due to the provision of the plurality of AND gates, each of the abnormality informing signals is not sent to the corresponding switch unit in the preceding stage when a connection request signal corresponding to the abnormality informing signals is not active.

Figure 7:
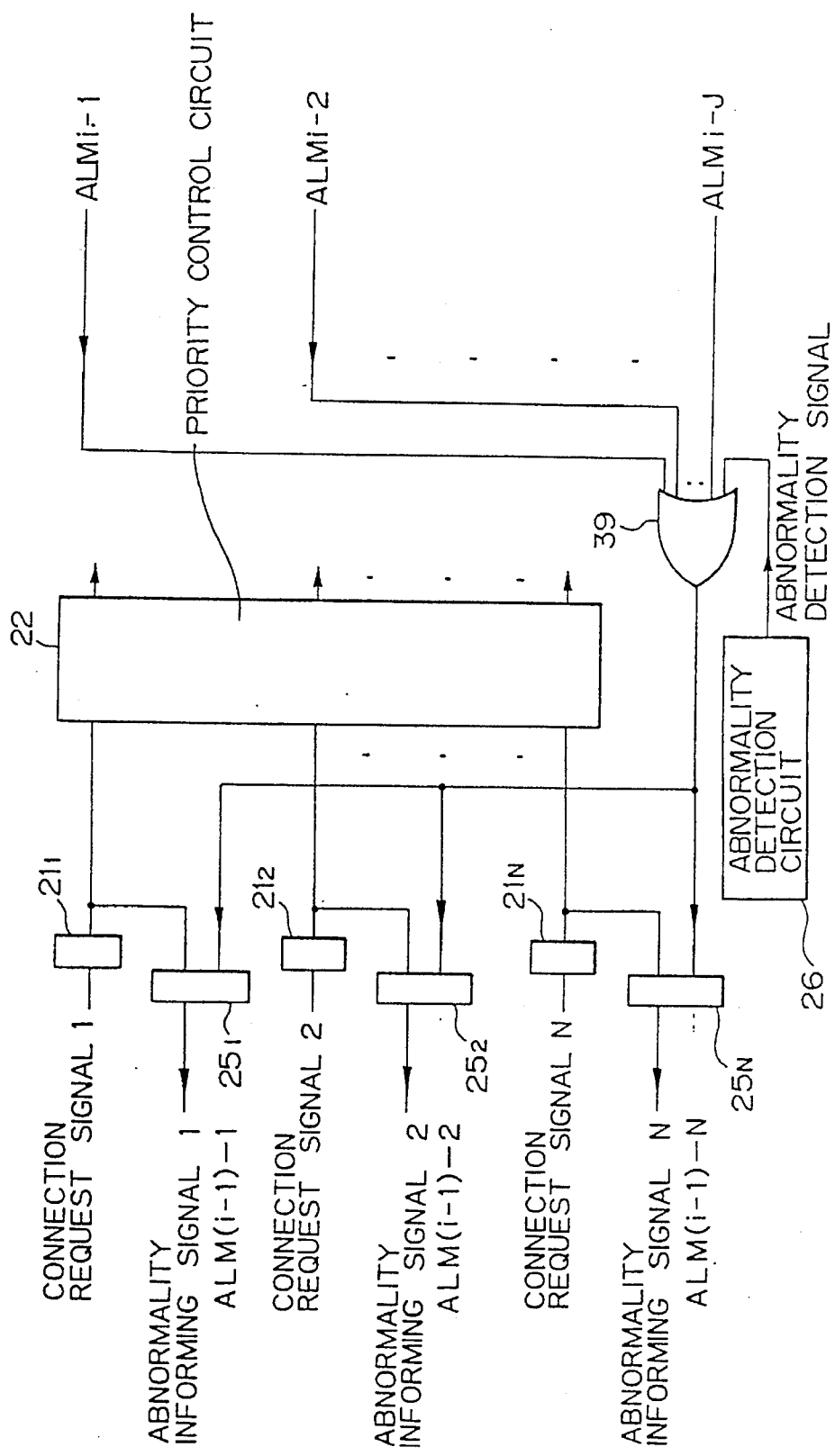
FIG. 7 is a diagram illustrating an example construction of the switch unit to be used in stages other than the final stage in the first embodiment of the networking apparatus, for detecting and informing of an abnormality.

First Embodiment of Switch Unit in Non-Final Stage (FIG. 7)

FIG. 7 is a diagram illustrating an example construction of the switch unit to be used in stages other than the final stage in the first embodiment of the networking apparatus, for detecting and informing of abnormality. In FIG. 7, reference numerals $21_1$ to $21_N$ each denote the register on the request input side in FIG. 4; 22 denotes the priority control circuit in FIG. 4; $25_1$ to $25_N$ denote a plurality of AND gates respectively provided corresponding to the registers $21_1$ to $21_N$ on the request input side, and 39 denotes an OR gate. ALMi-1, ALMi-2 ... ALMi-J denote abnormality informing signals which are transferred from switch units in the following stage(s), where J is an integer equal to the number of the data output ports of the switch circuit 20 (which is indicated in FIG. 4 and not indicated in FIG. 7) in the switch unit explained here with reference to FIG. 7. Although not shown, abnormality informing signal input ports are provided in each switch unit in stages other than the final stage, for inputting the above abnormality informing signals ALMi-1, ALMi-2 ... ALMi-J, corresponding to the output ports for outputting the allowed connection request signals in the information switch circuit 24. The abnormality informing signals are transferred from the switch units in the following stage(s) along the routes of the corresponding connection request signals (and the pieces of connection control information) in directions opposite to the respective connection request signals, and are applied through the above abnormality informing signal input ports to a plurality of input terminals of the OR gate 39. The output of the abnormality detection circuit 26 is applied to the other input terminal of the OR gate 39. Thus, the output of the OR gate 39 is active when abnormality is detected in a priority control circuit in at least one of the switch units in the following stage(s) to which the connection request signals from the subject switch unit have been transferred, or when abnormality in the priority control circuit 22 in the subject switch unit is detected by the abnormality detection circuit 26. The output of the OR gate 39 is applied to one of input terminals of each of the plurality of AND gates $25_1$ to $25_N$. The connection request signals output from the registers $21_1$ to $21_N$ on the request input side, are applied to the other input terminals of the respective AND gates $25_1$ to $25_N$. The outputs (abnormality informing signals) ALM(i−1)-1, ALM(i−1)-2, ... ALM(i−1)-N of the plurality of AND gates $25_1$ to $25_N$, are respectively transferred, as abnormality informing signals, to switch units in the preceding stage (when the subject switch unit is not in the first stage) or to data processing apparatuses (when the subject switch unit is in the first stage), which supply the corresponding connection request signals to the registers $121_1$ to $121_L$ on the request input side. Similar to the construction of FIG. 6, due to the provision of the plurality of AND gates, each of the abnormality informing signals is not sent to the corresponding switch unit in the preceding stage when a connection request signal corresponding to the abnormality informing signals is not active.

In the case wherein the subject switch unit is not in the first stage, each of the above abnormality informing signals ALM(i−1)-1, ALM(i−1)-2, ... ALM(i−1)-N is applied to an abnormality informing signal input ports (explained later with reference to FIG. 7) corresponding to an output port in an information switch circuits 24 in a switch unit in the preceding stage, which output port outputs the connection request signal corresponding to the abnormality informing signal. In the case wherein the construction of FIG. 7 is a switch unit in the first stage, an active abnormality informing signal is transferred to a data processing apparatus which has transferred a connection request signal to the subject switch unit, when abnormality is detected in a priority control circuit in any of switch units in the following stage(s) to which the connection request signals from the subject switch unit have been transferred, or when abnormality in the priority control circuit 22 in the subject switch unit is detected by the abnormality detection circuit 26. Thus, each data processing apparatus can recognize whether or not trouble has occurred in any of switch units located along the route of data transfer which the data processing apparatus requests to establish. When the data processing apparatus recognizes that trouble has occurred in any of the switch units along the route of data transfer which the data processing apparatus requests to establish, the data processing apparatus can transfer another request for requesting the estabitablishnt of a different route, to the networking apparatus.

Figure 8:
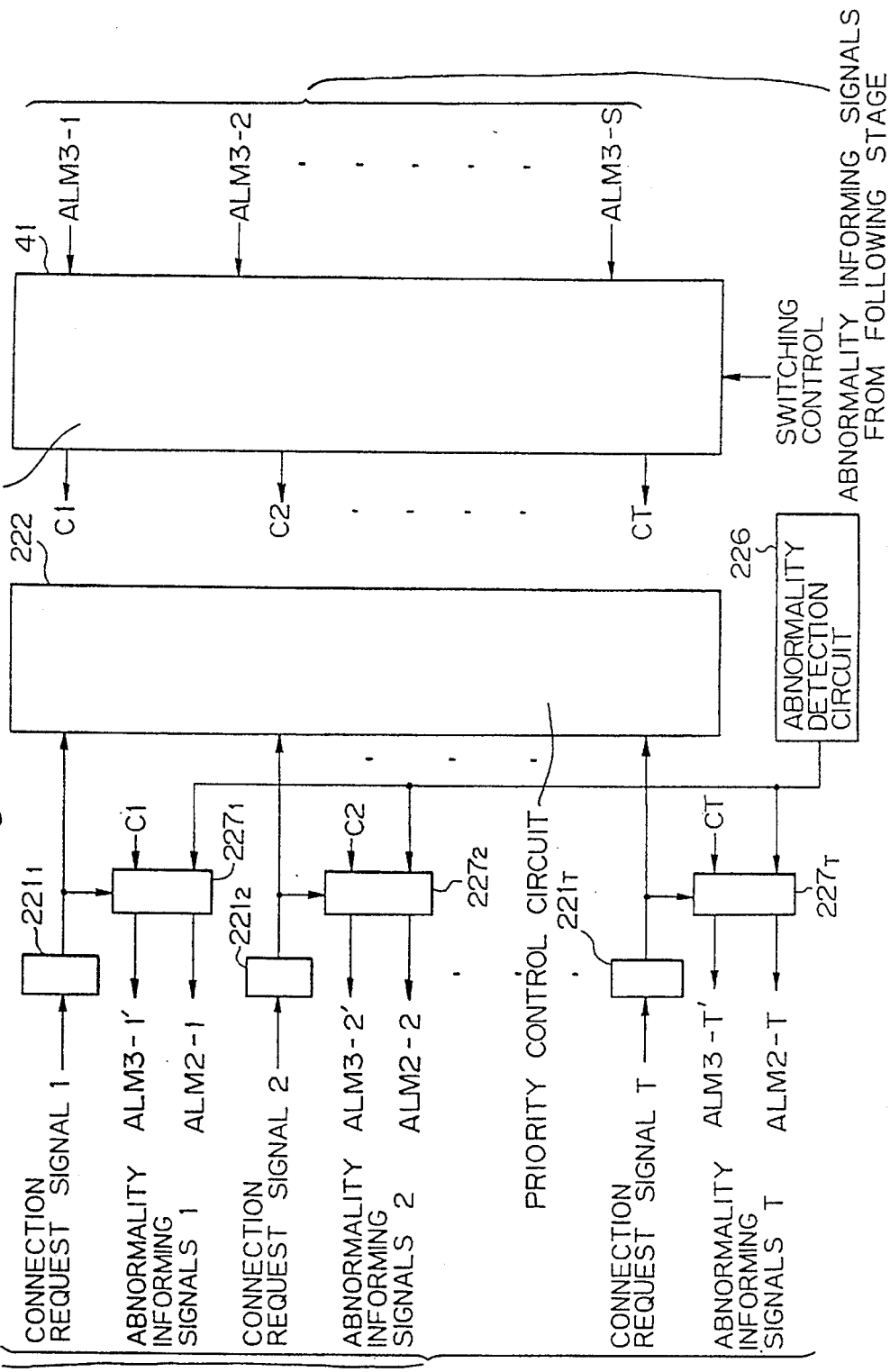
FIG. 8 is a diagram illustrating an example construction of the switch unit to be used in intermediate stages other than the first and final stages in the second embodiment of the networking apparatus, for detecting and informing of abnormality.
Figure 9:
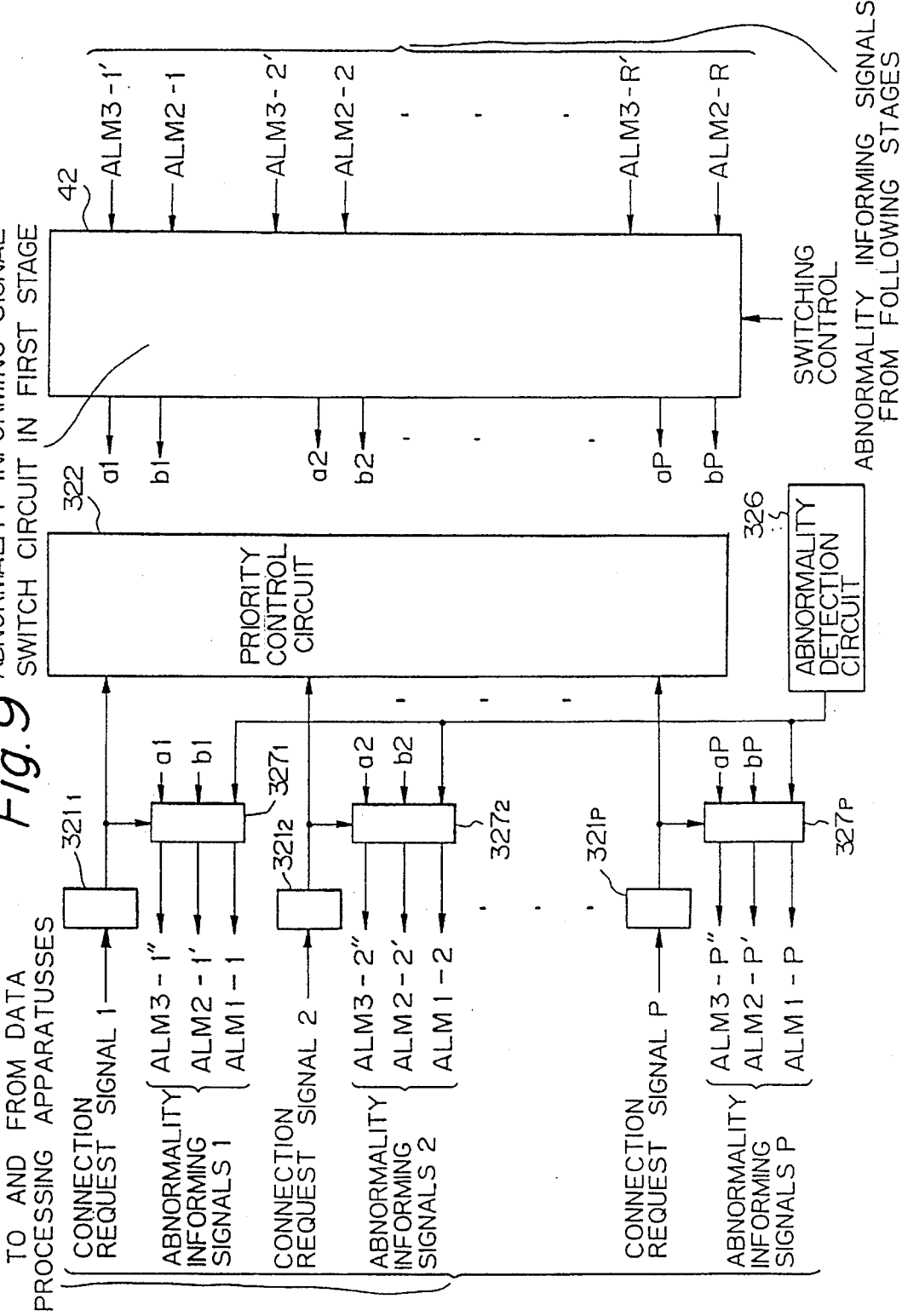
FIG. 9 is a diagram illustrating an example construction of the switch unit to be used in the first stage in the second embodiment of the networking apparatus, for detecting and informing of abnormality.

Second Embodiment of Switch Unit in Non-Final Stage (FIGS. 8 and 9)

FIG. 8 is a diagram illustrating an example construction of the switch unit to be used in intermediate stages other than the first and final stages in the second embodiment of the networking apparatus, for detecting and informing of abnormality. Although the following explanations of the second embodiments are made based on a switch unit of three stages for ease of explanation, it is easy to construct a switch unit of n stages, where n is an integer other than three, based on the following explanations.

In FIG. 8: reference numerals $221_1$ to $221_T$ each denote a register on the request input side, as indicated by $21_1$ to $21_N$ in FIG. 4; 222 denotes a priority control circuit, as indicated by 22 in FIG. 4; $227_1$ to $227_T$ denote a plurality of AND gates respectively provided corresponding to the registers $221_1$ to $221_T$ on the request input side, 226 denotes an abnormality detection circuit, and 41 denotes an abnormality informing signal switch circuit.

ALMi-1, ALMi-2 . . . ALMi-S denote abnormality informing signals which are transferred from switch units in the following stage(s), where S is an integer equal to the number of the data output ports of the switch circuit 20 (which is indicated in FIG. 4 and not indicated in FIG. 8) in the subject switch unit explained here with reference to FIG. 8. The abnormality informing signal switch circuit 41 has abnormality informing signal input ports, for inputting the above abnormality informing signals ALMi-1, ALMi-2 . . . ALMi-S, corresponding to the output ports for outputting the allowed connection request signals in the information switch circuit 24. The abnormality informing signal switch circuit 41 also has a plurality of output ports for outputting signals C1, C2, . . . CT. The above abnormality informing signals ALMi-1, ALMi-2 . . . ALMi-S input from the abnormality informing signal input ports of the abnormality informing signal switch circuit 41 are connected to the output ports thereof in the same manner as the connections of the connection allowance signals in the information switch circuit 24 (FIG. 4) in the same switch unit. These connections are realized by applying the aforementioned group of pieces of partial information to be used for controlling the switch circuit 20, to the abnormality informing signal switch circuit 41 as control information at the same time as the timing of applying the same to the information switch circuit 24 in FIG. 4. Thus, the above abnormality informing signals ALMi-1, ALMi-2 . . . ALMi-S are arranged in the order of the corresponding connection request signals. Each of the outputs C1, C2, ... CT (the ordered abnormality informing signals ALMi-1, ALMi-2 .. . ALMi-S) are applied to one of two input terminals of a corresponding one of the gate circuits $227_1$, $227_2$, ... $227_T$. The abnormality detection circuit 226 detects an abnormality in the priority control circuit 222 to output abnormality detection signal. The abnormality detection signal output from the abnormality detection circuit 226 is applied to the other of the input terminals of the gate circuits $227_1$, $227_2$, ... $227_T$. Each of the gate circuits $227_1$, $227_2$, ... $227_T$, receives at a control input terminal thereof the output (the corresponding connection request signal) of a corresponding one of the registers $221_1$, $221_2$, ... $221_T$, as a gate control signal. Thus, each of the gate circuits $227_k$ (k=1 to T) outputs two output signals ALM3-1' and ALM2-k (k=1 to T) only when the corresponding connection request signal is active. The output signal ALM3-k' corresponds to a corresponding one of the above ordered abnormality informing signal ALMi-1, ALMi-2 ... ALMi-S, and the output signal ALM2-k corresponds to the abnormality detection signal generated within the same switch unit. The above output signals ALM3-k' and ALM2-k from each gate circuit $227_k$ are transferred to a switch unit in the preceding stage on the route of the corresponding connection request signal.

FIG. 9 is a diagram illustrating an example construction of the switch unit to be used in the first stage in the second embodiment of the networking apparatus, for detecting and informing of an abnormality. In FIG. 9: reference numerals $321_1$ to $321_P$ denote registers on the request input side, corresponding to the registers $21_1$ to $21_N$ On the request input side in FIG. 4; 322 denotes a priority control circuit corresponding to the priority control circuit 22 in FIG. 4; 326 denotes an abnormality detection circuit; and 42 denotes an abnormality informing signal switch circuit.

In the construction of FIG. 9, the abnormality informing signal switch circuit 42 receives the above-mentioned output signals ALM3-k' and ALM2-k output from each gate circuit $227_k$ of FIG. 8 for each route of the connection request signal passing through the subject switch unit from a corresponding one of the switch units in the following stages. In FIG. 9, these abnormality informing signals (a pair of abnormality informing signals for each route) from the switch units in the following stages are denoted by ALM3-j' and ALM2-j (j=1 to R). The pair of abnormality informing signals for each route are respectively switched to a corresponding pair of output signals am and bm (m=1 to P) in the abnormality informing signal switch circuit 42. The abnormality informing signal switch circuit 42 operates in a manner similar to the abnormality informing signal switch circuit 41 in the construction of FIG. 8. That is, the pair of abnormality informing signals for each route are respectively switched to a corresponding pair of output signals am and bm (m=1 to P) in the abnormality informing signal switch circuit 42 in the same manner as the corresponding connection allowance signal in the information switch circuit 24 of FIG. 4. Thus, the pairs of abnormality informing signals ALM3-j', ALM2-j (j=1 to R) are arranged in the order of the corresponding connection request signals. Each pair of the output signals am and bm (m=1 to P) (the ordered pair of abnormality informing signals ALM3-j', ALM2-j (j=1 to R)) are applied to two of three input terminals of a corresponding one of the gate circuits $327_1$, $327_2$, ... $327_P$. The abnormality detection circuit 326 detects and abnormality in the priority control circuit 322 and output an abnormality detection signal. The abnormality detection signal output from the abnormality detection circuit 326 is applied to the other of the input terminals of the gate circuits $327_1$, $327_2$, ... $327_P$. Each of the gate circuits $327_1$, $327_2$, ... $327_P$, receives at a control input terminal thereof the output (the corresponding connection request signal) of a corresponding one of the registers $321_1$, $321_2$, ... $321_P$, as a gate control signal. Thus, each of the gate circuits $327_m$ (m=1 to P) outputs three output signals ALM3-m", ALM2-m' and ALMi-m (m=1 to P) only when the corresponding connection request signal is active. The output signal ALM3-m" corresponds to an abnormality informing signal generated in the third stage on the route of a corresponding connection request signal, the output signal ALM42-m' corresponds to an abnormality informing signal generated in the second stage on the route of the corresponding connection request signal and the output signal ALM1-m corresponds to the abnormality detection signal generated within the same switch unit. The above output signals ALM3-m", ALM2-m', and ALM1-m from each gate circuit $327_m$ are transferred to a corresponding data processing apparatus which outputs the corresponding connection request signal.

Generally, when the networking apparatus is constituted by n stages, the abnormality informing signal switch circuit 41 in a switch unit which is used in the i-th stage (i is an integer) where n is an integer, can be constructed so that the abnormality informing signal switch circuit receives (n−i) abnormality informing signals in parallel for each route of the connection request signal, and the parallel abnormality informing signals are switched in the same manner as the abnormality informing signals input into the abnormality informing signal switch circuit 41 explained above, to be applied to a corresponding gate circuit which has (n−i) +1 input terminals, instead of the above two or three input terminals in the gate circuit $227_k$ in FIG. 8 or $327_k$ in FIG. 9. According to this construction, each data processing apparatus which has output a connection request signal, can receive in parallel the abnormality informing signals corresponding to the respective stages on the route of the connection request signal. Namely, each data processing apparatus which has output a connection request signal to the networking apparatus, can recognize where an abnormality occurs on the route which the connection request signal is requesting to establish in the networking apparatus. Therefore, each data processing apparatus can select another piece of connection control information among the aforementioned more than one piece of connection control information so that a route requested by the selected piece of connection control information does not pass through the switch unit in which the abnormality is detected, and can resend a connection request signal accompanied by another piece of connection control information among the aforementioned more than one piece of connection control information. This operation can be performed in accordance with a program which is installed in each data processing apparatus in advance of the operation of the multiprocessor system.

Figure 10:
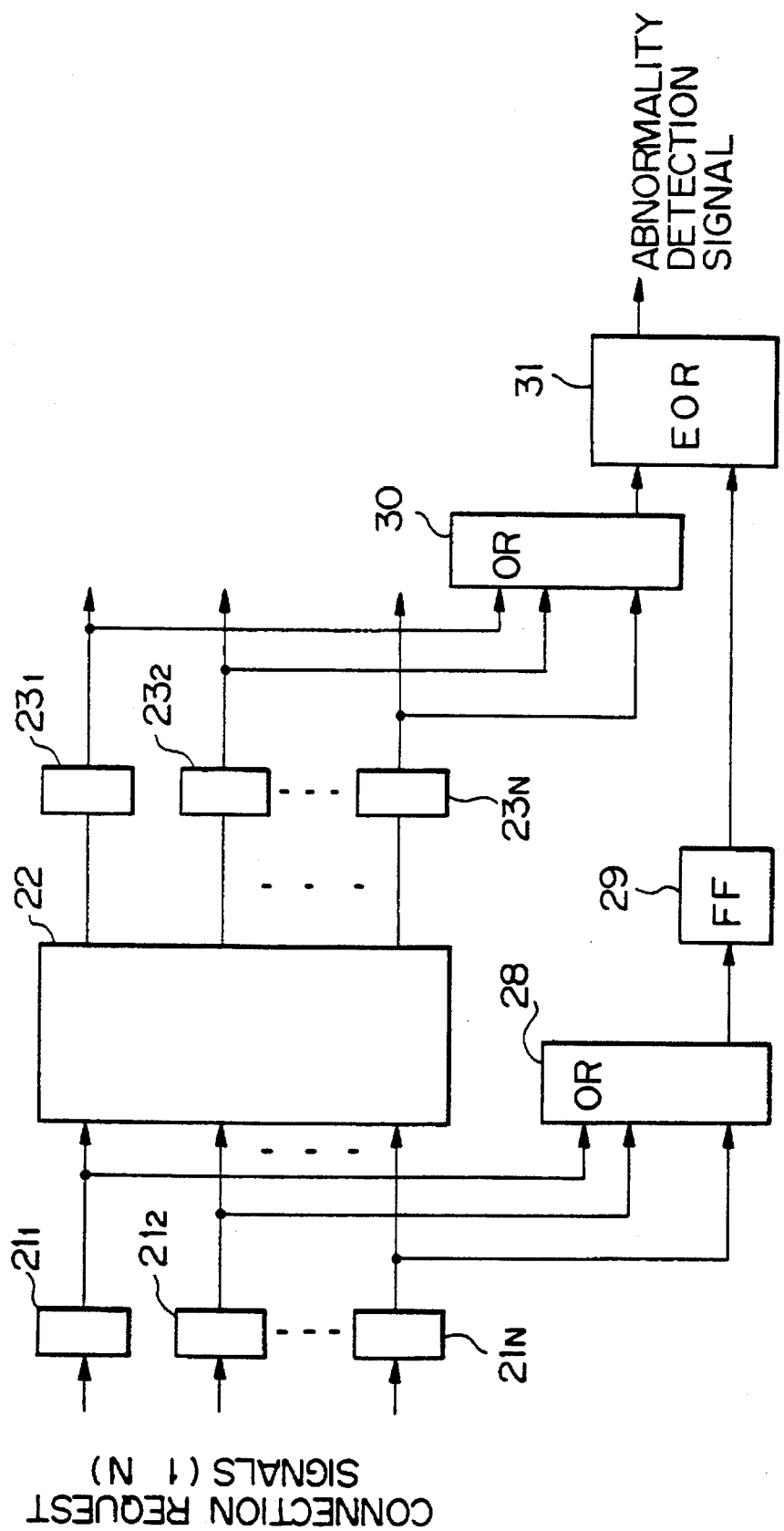
FIG. 10 is a diagram illustrating an example construction of the abnormality detecting circuit to be used in the first and second embodiments of the present invention.

Abnormality Detection Circuit (FIG. 10)

FIG. 10 is a diagram illustrating an example construction of the abnormality detecting circuit to be used in the first and second embodiments of the present invention. In FIG. 10, reference numerals $21_1$, $21_2$, ... $21_N$ each denote the register on the request input side of FIG. 4, 22 denotes the priority control circuit of FIG. 4, $23_1$, $23_2$, ... $23_N$ each denote the register on the allowance output side of FIG. 4, 28 and 30 each denote an OR gate, 29 denotes a flip flop circuit, and 31 denotes an exclusive OR (EOR) gate.

The OR gate 28 outputs an active signal when at least one of the plurality of registers $21_1, 21_2, \ldots 21_N$ on the request input side, outputs an active connection request signal. The output of the OR gate 28 is applied to the flip flop circuit 29, and is latched therein. On the other hand, the OR gate 30 outputs an active signal when at least one of the plurality of registers $23_1, 23_2, \ldots 23_N$ on the allowance output side, outputs an active connection request signal. The outputs of the OR gate 30 and the flip flop circuit 29 are applied to the exclusive OR (EOR) gate 31. Thus, the exclusive OR (EOR) gate 31 outputs an active signal when only one of the OR gates 28 and 30 outputs an active signal. Since at least one active connection request signal is applied to the priority control circuit 22, the priority control circuit 22 should pass therethrough at least one of the at least one active connection request signal, and the at least one active connection request signal passed through the priority control circuit 22 should appear as an active output signal of at least one of the registers $23_1, 23_2, \ldots 23_N$ on the allowance output side, the active output of the exclusive OR (EOR) gate 31 indicates that abnormality occurs in the priority control circuit 22. Therefore, the output of the exclusive OR (EOR) gate 31 is used as the aforementioned abnormality detection signal.

We claim:

1. A system for networking multiple data processing apparatuses, comprising:

a plurality of data processing apparatuses, each data processing apparatus including a connection request information output unit which produces connection request information to request a connection to a different respective data processing apparatus of the plurality of data processing apparatuses, the connection request information produced by the connection request information output unit of a respective data processing apparatus including a connection request signal indicating whether the respective data processing apparatus has requested a connection, a switch control information storage unit which stores switch control information, a reading unit for reading the switch control information stored in the switch control information storage unit and for including the switch control information in the connection request information, an other information finding unit, and an other information output unit, where the connection request information output unit of a respective data processing apparatus of the plurality of data processing apparatuses, defined as a first data processing apparatus, produces connection request information to request a connection to a different respective data processing apparatus of the plurality of data processing apparatuses, defined as a second data processing apparatus; and a network to which each of the plurality of data processing apparatuses is connected and which allows the first data processing apparatus to establish a connection through the network to the second data processing apparatus and then, once the connection is established, allows the first data processing apparatus to transfer data through the network to the second data processing apparatus, the connection request information produced by the first data processing apparatus indicating at least one requested route for connecting the first data processing apparatus to the second data processing apparatus through the network, the network comprising a priority control unit receiving the connection request information from the first data processing apparatus and, based on the received connection request information and a predetermined priority order, determining a route from the at least one requested route indicated by the received connection request information which is available for connecting the first data processing apparatus to the second data processing apparatus, a switch unit establishing the route determined by the priority control unit, the connection request information produced by the first data processing apparatus including switch control information stored in the switch control information storage unit of the first data processing apparatus for controlling the switch unit to establish the route determined by the priority control unit, and an abnormality detecting unit monitoring the priority control unit to detect abnormalities in the operation of the priority control unit, generating an abnormality informing signal when an abnormality is detected and providing the generated abnormality informing signal to the first data processing apparatus, wherein the other information finding unit of the first data processing apparatus receives the abnormality informing signal generated by the abnormality detecting unit and determines whether additional switch control information is stored in the switch control information storage unit of the first data processing apparatus for establishing a different route to the second data processing apparatus and, when the other information finding unit of the first data processing apparatus determines that there is additional switch control information for establishing a different route, the connection request information output unit of the first data processing apparatus produces new connection request information and the other information output unit of the first data processing apparatus includes the additional switch control information in the new connection request information.

2. A system according to claim 1, wherein the priority control unit has an input and an output and the abnormality detecting unit detects as the abnormality a contradiction between the input and the output of the priority control unit.

3. A system according to claim 3, wherein:

the priority control unit produces a connection allowance signal when a route is determined, and the abnormality detecting unit detects as the contradiction a first condition that the priority control unit does not produce a connection allowance signal when the priority control unit receives connection request information, and a second condition that the priority control unit produces a connection allowance signal when the priority control unit does not receive connection request information.

4. A system according to claim 2, wherein the abnormality detecting unit comprises:

an abnormality detection signal generating unit for generating, in response to the detection of the contradiction, an abnormality detection signal indicated that the abnormality detecting unit has detected the contradiction, and a gate unit for receiving the abnormality detection signal and the connection request signal from the first data processing apparatus, and providing the abnormality detection signal as the abnormality informing signal to the first data processing apparatus, the abnormality detection signal not being provided to the other data processing apparatuses of the plurality of data processing apparatuses.

5. A system for networking multiple data processing apparatuses, comprising:

a plurality of data processing apparatuses, each data processing apparatus including a connection request information output unit which produces connection request information to request a connection to a different respective data processing apparatus of the plurality of data processing apparatuses, the connection request information produced by the connection request information output unit of a respective data processing apparatus including a connection request signal indicating whether the respective data processing apparatus has requested a connection; and a network to which each of the plurality of data processing apparatuses is connected and which allows the first data processing apparatus to establish a connection through the network to the second data processing apparatus and then, once the connection is established, allows the first data processing apparatus to transfer data through the network to the second data processing apparatus, the connection request information produced by the first data processing apparatus indicating at least one requested route for connecting the first data processing apparatus to the second data processing apparatus through the network, the network comprising a priority control unit receiving the connection request information from the first data processing apparatus and, based on the received connection request information and a predetermined priority order, determining a route from the at least one requested route indicated by the received connection request information which is available for connecting the first data processing apparatus to the second data processing apparatus, a switch unit establishing the route determined by the priority control unit, the connection request information produced by the first data processing apparatus including switch control information for controlling the switch unit to establish the route determined by the priority control unit, and an abnormality detecting unit monitoring the priority control unit to detect abnormalities in the operation of the priority control unit, generating an abnormality informing signal when an abnormality is detected and providing the generated abnormality informing signal to the first data processing apparatus, wherein the switch unit comprises a plurality of stages which each include at least one switch circuit, each switch circuit having at least one input port and at least one output port and a respective switch circuit in each stage providing a partial route within the associated stage for forming the route determined by the priority control unit, the switch control information included in the connection request information comprises a plurality of pieces of partial switch control information for controlling the at least one switch circuit in the plurality of stages of the switch unit, respectively, to form the route determined by the priority control unit, the priority control unit comprises priority control circuits respectively corresponding to the switch circuits, each priority control circuit controlling the corresponding switch circuit so that, in each stage, a respective switch circuit provides a partial route, defined as a first partial route, in accordance with a corresponding one of the plurality of pieces of partial switch control information, the abnormality detecting unit comprises abnormality detecting and informing units respectfully corresponding to the switch circuits, each abnormality detecting and informing unit comprising an abnormality detection circuit detecting an abnormality in the priority control circuit corresponding to the switch circuit associated with the respective abnormality detection circuit and generating an abnormality detection signal upon detection of an abnormality, an abnormality detection signal transferring unit for transferring the abnormality detection signal along the route determined by the priority control unit through the switch circuit corresponding to the associated abnormality detecting and informing unit, the abnormality detection signal being transferred in a direction opposite to the direction by which data is transferred through the route, and an abnormality informing unit
detecting, for each route of the at least one requested route for connecting the first data processing apparatus to the second data processing apparatus, the generation of an abnormality detection signal by a respective abnormality detection circuits in each stage located along the respective route,
generating an abnormality informing signal, and
providing the abnormality informing signal to the first data processing apparatus.

6. A system according to claim 5, wherein the network further comprises:

a connection request information switch circuit, provided for each of the switch circuits in the stages other than the final stage, for forming a second partial route for transferring the connection request information so that the connection request information can be supplied to the priority control circuit corresponding to the switch circuit located along each route, and the connection request signal can be supplied to the abnormality detecting and informing unit corresponding to the priority control circuit, where the connection request information output from the data processing apparatus is supplied to the priority control circuit in the first stage, and is then supplied to the priority control circuit corresponding to the switch circuit in each stage located along each route for the data transfer, through the second partial route provided by the connection request information switch circuit, and the connection request signal in the connection request information output from the data processing apparatus is supplied to the abnormality detecting and informing unit in the first stage, and is then supplied to the abnormality detecting and informing unit corresponding to the switch circuit in each stage located along each route for the data transfer, through the connection request information switch circuit;

a connection allowance signal switch circuit, provided for each connection request information switch circuit, for providing a third partial route in the direction opposite to the direction of the second partial route provided by the corresponding connection request information switch circuit, so that a partial connection allowance signal output from a priority control circuit in each following stage is transferred, in the direction opposite to the direction of the connection request information, to the priority control circuit in the preceding stage and along the route for supplying the connection request information to the priority control circuit corresponding to the switch circuit in each stage located along each route for the data transfer;

each priority control circuit in the stages other than the first and final stages receives the connection request information and the partial connection allowance signal output from the priority control circuit in each following stage through the connection allowance signal switch circuit, determines, as the first partial route in the switch circuit corresponding to the priority control circuit, one of a plurality of candidates for the first partial route in the switch circuit corresponding to the priority control circuit, when the one of the plurality of candidates for the first partial route is requested by the partial switch control information in the the connection request information, and can be concurrently established in the switch circuit, and the partial connection allowance signal for the one of the plurality of candidates for the first partial route is received from the priority control circuit in following stages located along a route for the data transfer containing the one of the plurality of candidates for the first partial route, controls the corresponding switch circuit, the corresponding connection request signal switch circuit, and the corresponding connection allowance signal switch circuit, so that the determined first partial route is established in the corresponding switch circuit, the second partial route is established in the connection request signal switch circuit corresponding to the switch circuit in the same manner as the first partial route, and the third partial route in the direction opposite to the second partial route is established in the connection allowance signal switch circuit corresponding to the connection request signal switch circuit, and outputs the partial connection allowance signal corresponding to the first partial route;

the priority control circuit in the final stage receives the connection request information, determines, as the first partial route in the switch circuit in the final stage, one of the plurality of candidates for the first partial route in the switch circuit in the final stage, when the one of the plurality of candidates for the first partial route can be concurrently established in the switch circuit and requested by the piece of partial switch control information for controlling the switch circuit in the final stage, included in the connection request information, controls the switch circuit so that the one of the plurality of candidates for the first partial route is established in the switch circuit in the final stage, and outputs the partial connection allowance signal to a priority control circuit in the preceding stage located along a route containing the first partial route;

the priority control circuit in the first stage receives the connection request information and the partial connection allowance signal output from the priority control circuit in the following stage(s) through the connection allowance signal switch circuit, determines, as the first partial route in the switch circuit in the first stage, one of the plurality of candidates for the first partial route in the switch circuit, which is requested by the partial switch control information in the the connection request information, and can be concurrently established in the switch circuit, and the partial connection allowance signal for the one of the plurality of candidates for the first partial route is received from the priority control circuit in the following stage(s) located along a route for the data transfer containing the one of the plurality of candidates for the first partial route, controls the corresponding switch circuit, the corresponding connection request signal switch circuit, and the corresponding connection allowance signal switch circuit, so that the determined first partial route is established in the corresponding switch circuit, the second partial route is established in the connection request signal switch circuit corresponding to the switch circuit in the same manner as the first partial route, and the third partial route in the direction opposite to the second partial route established in the allowance signal switch circuit corresponding to the connection request signal switch circuit, and outputs the partial connection allowance signal corresponding to the first partial route, to one of the data processing apparatuses which outputs the connection request information requesting the route containing the determined first partial route;

each abnormality detecting and informing unit corresponding to a switch circuit in the final stage of the switch unit comprises a plurality of abnormality informing gates, a respective abnormality informing gate provided for and corresponding to one of the input ports of the corresponding switch circuit, and each abnormality informing gate receiving the connection request signal included in the connection request information requesting a route containing the first partial route starting at the corresponding input port, and the abnormality detection signal generated by the abnormality detection circuit in the abnormality detecting and informing unit, and outputting as a partial abnormality informing signal the abnormality detection signal to an abnormality detecting and informing unit in the preceding stage only when the connection request signal is active;

the network comprises, for each stage in each route of the data transfer, an abnormality informing signal switch circuit, corresponding to each connection allowance signal switch circuit, for establishing a fourth partial route connecting an input port with an output port of the abnormality informing signal switch circuit in the same manner as the corresponding connection by the third route in the connection allowance signal switch circuit, so that a partial abnormality informing signal output from an abnormality detecting and informing unit in the following stage(s) is transferred to the priority control circuit corresponding to the switch circuit establishing the first partial route in the stage in the route;

each abnormality detecting and informing unit in stages other than the final stage comprises an OR gate for receiving as a first abnormality detection signal the abnormality detection signal generated by the abnormality detection circuit in the abnormality detecting and informing unit, receiving as a second abnormality detection signal the abnormality detection signal transferred from the abnormality detecting and informing unit in the following stage(s) through the fourth partial route in the abnormality informing signal switch circuit, and obtaining and outputting a logical sum of the first and second abnormality detection signals;

each abnormality detecting and informing unit in stages other than the first and final stages, comprises a plurality of first abnormality informing signal gates, each provided corresponding to one of the input ports of the corresponding switch circuit, for receiving the connection request signal included in the connection request information requesting the route starting at the corresponding input port and containing the first partial route, and the logical sum output from the OR gate, and for outputting as another partial abnormality informing signal the logical sum to the abnormality detecting and informing unit in the preceding stage only when the connection request signal is active; and each abnormality detecting and informing unit in the first stage comprises a plurality of second abnormality informing signal gates, a respective second abnormality informing signal gate provided for, and corresponding to, each input port of the switch circuit corresponding to the abnormality detecting and informing unit, for receiving the connection request signal included in the connection request information requesting the route starting at the corresponding input port and containing the first partial route, and the logical sum output from the OR gate, and for outputting as another partial abnormality informing signal the logical sum to one of the data processing apparatuses which outputs the connection request information only when the connection request signal is active.

7. A system for networking multiple data processing apparatuses, comprising:

a plurality of data processing apparatuses, each data processing apparatus including a connection request information output unit which produces connection request information to request a connection to a different respective data processing apparatus of the plurality of data processing apparatuses, the connection request information produced by the connection request information output unit of a respective data processing apparatus including a connection request signal indicating whether the respective data processing apparatus has requested a connection; and a network to which each of the plurality of data processing apparatuses is connected and which allows the first data processing apparatus to establish a connection through the network to the second data processing apparatus and then, once the connection is established, allows the first data processing apparatus to transfer data through the network to the second data processing apparatus, the connection request information produced by the first data processing apparatus indicating at least one requested route for connecting the first data processing apparatus to the second data processing apparatus through the network, the network comprising a priority control unit receiving the connection request information from the first data processing apparatus and, based on the received connection request information and a predetermined priority order, determining a route from the at least one requested route indicated by the received connection request information which is available for connecting the first data processing apparatus to the second data processing apparatus, a switch unit establishing the route determined by the priority control unit, the connection request information produced by the first data processing apparatus including switch control information for controlling the switch unit to establish the route determined by the priority control unit, and an abnormality detecting unit monitoring the priority control unit to detect abnormalities in the operation of the priority control unit, generating an abnormality informing signal when an abnormality is detected and providing the generated abnormality informing signal to the first data processing apparatus, wherein the switch unit comprises a plurality of stages which each include at least one switch circuit, each switch circuit having at least one input port and at least one output port and a respective switch circuit in each stage providing a partial route within the associated stage for forming the route determined by the priority control unit, the switch control information included in the connection request information comprises a plurality of pieces of partial switch control information for controlling the at least one switch circuit in the plurality of stages of the switch unit, respectively, to form the route determined by the priority control unit, the priority control unit comprises priority control circuits respectively corresponding to the switch circuits, each priority control circuit controlling the corresponding switch circuit so that, in each stage, a respective switch circuit provides a partial route in accordance with a corresponding one of the plurality of pieces of partial switch control information, and the abnormality detecting unit comprises abnormality detecting and informing units respectfully corresponding to the switch circuits, each abnormality detecting and informing unit comprising an abnormality detection circuit detecting an abnormality in the priority control circuit corresponding to the switch circuit associated with the respective abnormality detection circuit and generating an abnormality detection signal upon detection of an abnormality, an abnormality detection signal transferring unit for transferring the abnormality detection signal along the route determined by the priority control unit through the switch circuit corresponding to the associated abnormality detecting informing unit, the abnormality detection signal being transferred in a direction opposite to the direction by which data is transferred through the route, and for maintaining identification of each stage of the switch unit at which an abnormality detection signal has been generated, and an abnormality informing unit
detecting, for each route of the at least one requested route for connecting the first data processing apparatus to the second data processing apparatus and for each switch circuit, the generation of an abnormality detection signal by a respective abnormality detection circuits in each stage located along the respective route, generating an abnormality informing signal, and providing the abnormality informing signal to the first data processing apparatus.

8. A system according to claim 7, wherein the network further comprises:

a connection request information switch circuit, provided for each of the switch circuits in the stages other than the final stage, for forming a second partial route for transferring the connection request information, so that the connection request information can be supplied to the priority control circuit corresponding to the switch circuit located along each route, and the connection request signal can be supplied to the abnormality detecting and informing unit corresponding to the priority control circuit, where the connection request information output from the data processing apparatus is supplied to the priority control circuit in the first stage, and is then supplied to the priority control circuit corresponding to the switch circuit in each stage located along each route for the data transfer, through the second partial route provided by the connection request information switch circuit, and the connection request signal in the connection request information output from the data processing apparatus is supplied to the abnormality detecting and informing unit in the first stage, and is then supplied to the abnormality detecting and informing unit corresponding to the switch circuit in each stage located along each route for the data transfer, through the connection request information switch circuit;

a connection allowance signal switch circuit, provided for each connection request information switch circuit, for providing a third partial route in the direction opposite to the direction of the second partial route provided by the corresponding connection request information switch circuit, so that a partial connection allowance signal output from a priority control circuit in each following stage is transferred, in the direction opposite to the direction of the connection request information, to the priority control circuit in the preceding stage and along the route for supplying the connection request information to the priority control circuit corresponding to the switch circuit in each stage located along each route for the data transfer;

each priority control circuit in the stages other than the first and final stages receives the connection request information and the partial connection allowance signal output from the priority control circuit in each following stage through the connection allowance signal switch circuit, determines, as the first partial route in the switch circuit corresponding to the priority control circuit, one of a plurality of candidates for the first partial route in the switch circuit corresponding to the priority control circuit, when the one of the plurality of candidates for the first partial route is requested by the partial switch control information in the the connection request information, and can be concurrently established in the switch circuit, and the partial connection allowance signal for the one of the plurality of candidates for the first partial route is received from the priority control circuit in following stages located along a route for the data transfer containing the one of the plurality of candidates for the first partial route, controls the corresponding switch circuit, the corresponding connection request signal switch circuit, and the corresponding connection allowance signal switch circuit, so that the determined first partial route is established in the corresponding switch circuit, the second partial route is established in the connection request signal switch circuit corresponding to the switch circuit in the same manner as the first partial route, and the third partial route in the direction opposite to the second partial route is established in the connection allowance signal switch circuit corresponding to the connection request signal switch circuit, and outputs the partial connection allowance signal corresponding to the first partial route;

the priority control circuit in the final stage receives the connection request information, determines, as the first partial route in the switch circuit in the final stage, one of the plurality of candidates for the first partial route in the switch circuit in the final stage, when the one of the plurality of candidates for the first partial route can be concurrently established in the switch circuit and requested by the piece of partial switch control information for controlling the switch circuit in the final stage, included in the connection request information, controls the switch circuit so that the one of the plurality of candidates for the first partial route is established in the switch circuit in the final stage, and outputs the partial connection allowance signal to a priority control circuit in the preceding stage located along a route containing the first partial route;

the priority control circuit in the first stage receives the connection request information and the partial connection allowance signal output from the priority control circuit in the following stage(s) through the connection allowance signal switch circuit, determines, as the first partial route in the switch circuit in the first stage, one of plurality of candidates for the first partial route in the switch circuit, which is requested by the partial switch control information in the the connection request information, and can be concurrently established in the switch circuit, and the partial connection allowance signal for the one of the plurality of candidates for the first partial route is received from the priority control circuit in the following stage(s) located along a route for the data transfer containing the one of the plurality of candidates for the first partial route, controls the corresponding switch circuit, the corresponding connection request signal switch circuit, and the corresponding connection allowance signal switch circuit, so that the determined first partial route is established in the corresponding switch circuit, the second partial route is established in the connection request signal switch circuit corresponding to the switch circuit in the same manner as the first partial route, and the third partial route in the direction opposite to the second partial route is established in the connection allowance signal switch circuit corresponding to the connection request signal switch circuit, and outputs the partial connection allowance signal corresponding to the first partial route, to one of the data processing apparatuses which outputs the connection request information requesting the route containing the determined first partial route;

each abnormality detecting and informing unit corresponding to a switch circuit in the final stage of the switch unit comprises a plurality of abnormality informing gates, a respective abnormality informing gate provided for and corresponding to one of the input ports of the corresponding switch circuit, and each abnormality informing gate receiving the connection request signal included in the connection request information requesting a route starting at the corresponding input port and containing the first partial route, and the abnormality detection signal generated by the abnormality detection circuit in the abnormality detecting and informing unit, and outputting as a partial abnormality informing signal the abnormality detection signal to an abnormality detecting and informing unit in the preceding stage only when the connection request signal is active;

the network comprises, for each stage in each route of the data transfer, an abnormality informing signal switch circuit, corresponding to each connection allowance signal switch circuit, for establishing, for each partial abnormality informing signal output form an abnormality detecting and informing unit in the following stages, a fourth partial route connecting an input port with an output port of the abnormality informing signal switch circuit in the same manner as the corresponding connection by the third route in the connection allowance signal switch circuit, so that a partial abnormality informing signal output from an abnormality detecting and informing unit in the following stage(s) is transferred to the priority control circuit corresponding to the switch circuit establishing the first partial route in the stage in the route;

each abnormality detecting and informing unit in stages other than the first and final stages comprises a second plurality of abnormality information gates respectively provided for a corresponding input port of the switch circuit corresponding to the abnormality detecting and informing unit, for receiving the connection request signal containing the connection request information requesting a route containing the first partial route starting at the input port, the abnormality detection signal generated by the abnormality detection circuit in each abnormality detecting and informing unit, and one or more partial abnormality informing signals output from an abnormality detecting and informing unit in the following stages(s) through the fourth route in the abnormality informing signal switch circuit, and outputting as a plurality of partial abnormality informing signals from the abnormality detecting and informing unit, the abnormality detection signal and the one or more abnormality informing signals in parallel to an abnormality detecting and informing unit in the preceding stage, only when the connection request signal is active; and each abnormality detecting and informing unit in the first stage comprises a third plurality of abnormality informing signal gates, a respective abnormality informing signal gate of the third plurality of abnormality informing signal gates corresponding each input port of the switch circuit corresponding to the abnormality detecting and informing unit, for receiving the connection request signal included in the connection request information requesting the route containing the first partial route starting at the corresponding input port, the abnormality detection signal generated by the abnormality detection circuit in each abnormality detecting and informing unit, and one or more partial abnormality informing signals output from an abnormality detecting and informing unit in the following stage(s) through the fourth route in the abnormality informing signal switch circuit, and outputting as a plurality of partial abnormality informing signals from the abnormality detecting and informing unit, the abnormality detection signal and the one or more abnormality informing signals in parallel to one of the data processing apparatuses which outputs the connection request information, only when the connection request sinal is active.

9. A system for networking multiple data processing apparatuses, comprising:

a plurality of data processing apparatuses, each data processing apparatus including a connection request information output unit which produces connection request information to request a connection to a different respective data processing apparatus of the plurality of data processing apparatuses; and a network to which each of the plurality of data processing apparatuses is connected and which allows a first data processing apparatus of the plurality of data processing apparatuses to establish a connection through the network to a second data processing apparatus of the plurality of data processing apparatuses and then, once the connection is established, allows the first data processing apparatus to transfer data through the network to the second data processing apparatus, the connection request information produced by the first data processing apparatus indicating at least one requested route for connecting the first data processing apparatus to the second data processing apparatus through the network, the network comprising a priority control unit receiving the connection request information from the first data processing apparatus and, based on the received connection request information and a predetermined priority order, determining a route from the at least one requested route indicated by the received connection request information which is available for connecting the first data processing apparatus to the second data processing apparatus, a switch unit establishing the route determined by the priority control unit, and an abnormality detecting unit monitoring the priority control unit to detect abnormalities in the operation of the priority control unit, generating an abnormality informing signal when an abnormality is detected and providing the generated abnormality informing signal to the first data processing apparatus, wherein the priority control unit has an input and an output and the abnormality detecting unit detects as the abnormality a contradiction between the input and the output of the priority control unit.

10. A system according to claim 9, wherein:

the priority control unit produces a connection allowance signal when a route is determined, and the abnormality detecting unit detects as the contradiction a first condition that the priority control unit does not produce a connection allowance signal when the priority control unit receives connection request information, and a second condition that the priority control unit produces a connection allowance signal when the priority control unit does not receive connection request information.

11. A system according to claim 9, wherein the abnormality detecting unit comprises:

an abnormality detection signal generating unit for generating, in response to the detection of the contradiction, an abnormality detection signal indicated that the abnormality detecting unit has detected the contradiction, and a gate unit for receiving the abnormality detection signal and the connection request signal from the first data processing apparatus, and providing the abnormality detection signal as the abnormality informing signal to the first data processing apparatus, the abnormality detection signal not being provided to the other data processing apparatuses of the plurality of data processing apparatuses.

* * * * *

UNITED STATES PATENT AND TRADEMARK OFFICE
CERTIFICATE OF CORRECTION

PATENT NO. : 5,572,679
DATED : November 5, 1996
INVENTOR(S) : Kenichi Ishizaka et al It is certified that error appears in the above-indentified patent and that said Letters Patent is hereby corrected as shown below:

Column 18, line 51, "$125_n$" to --$125_L$--.

Column 21, line 30, change "On" to --on--.

Column 22, line 7, change "ALMi-m" to --ALM1-m--.
line 11, change "ALM42-m" to --ALM2-m--.

Signed and Sealed this

Eleventh Day of February, 1997

Attest:

BRUCE LEHMAN

Attesting Officer

Commissioner of Patents and Trademarks